Jan. 2, 1951 P. L. TOLLISON ET AL 2,536,670
STEREOTYPE PLATEMAKING MACHINE
Filed Dec. 29, 1944 19 Sheets-Sheet 5

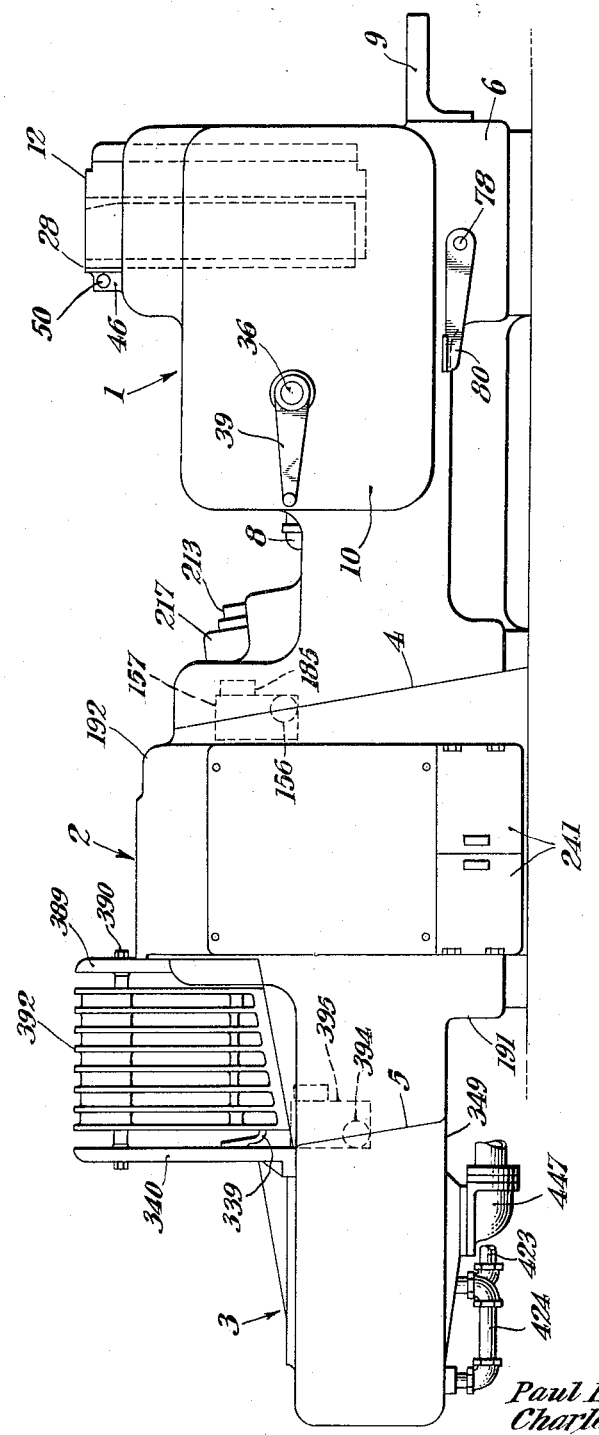

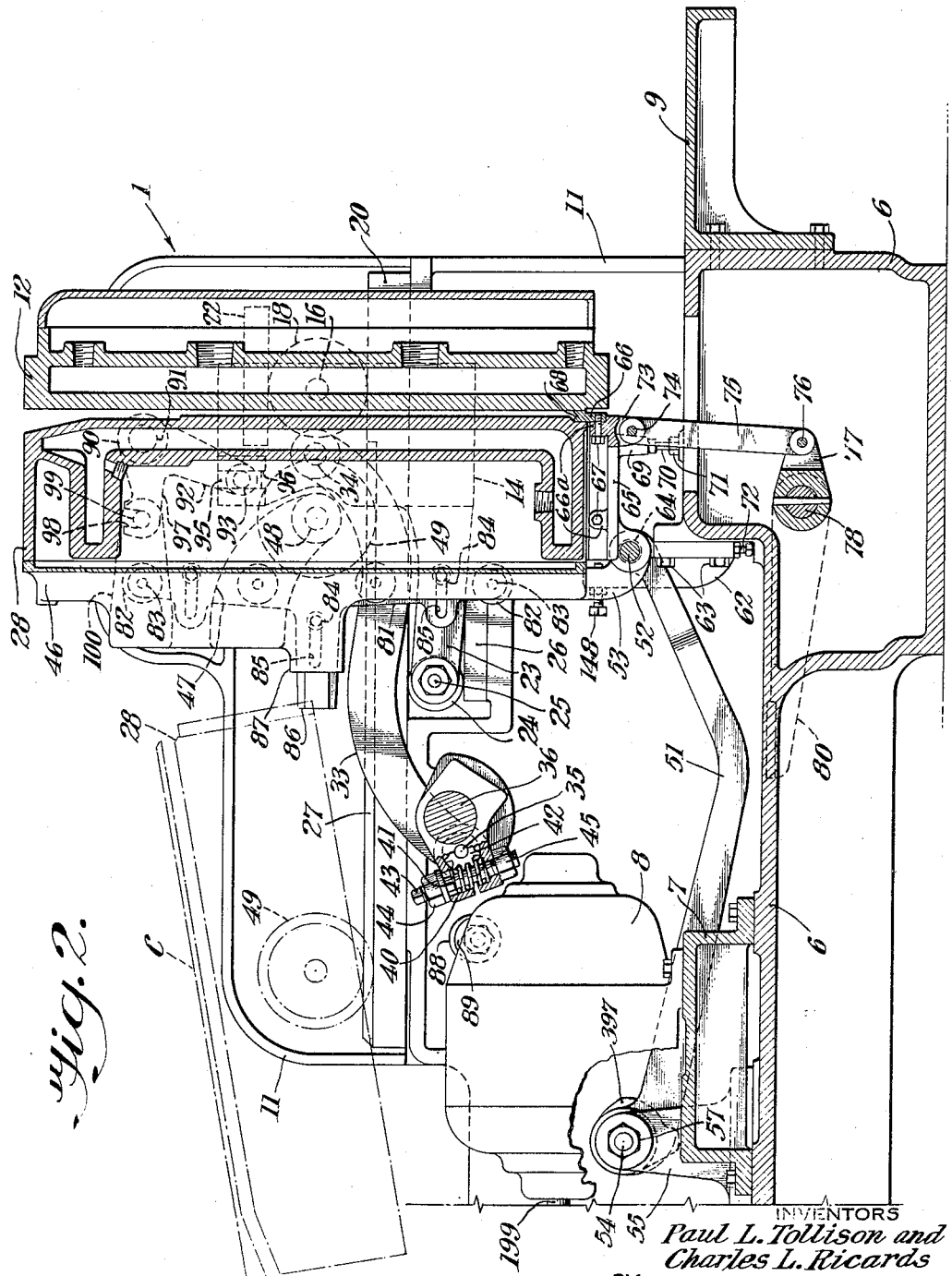

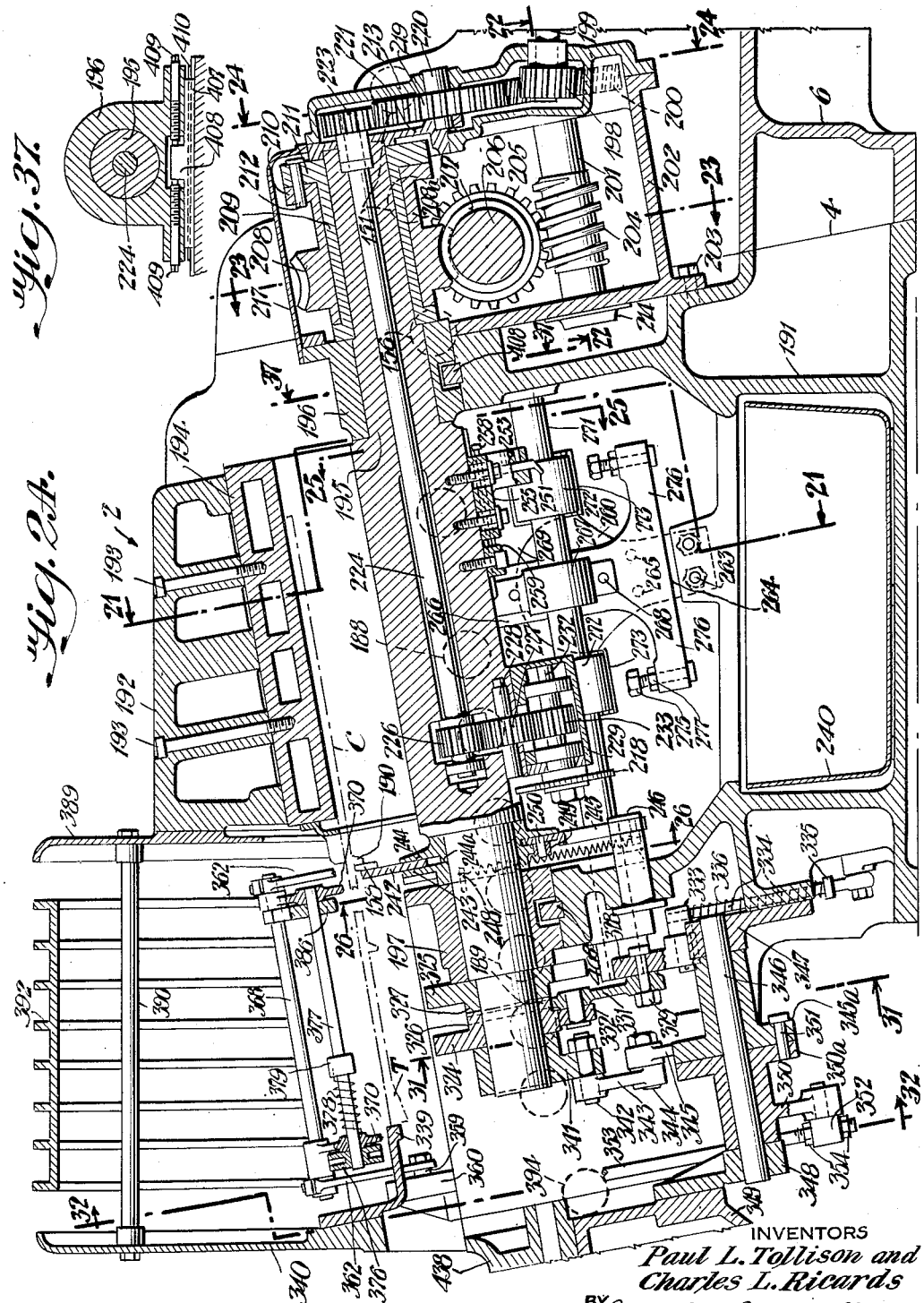

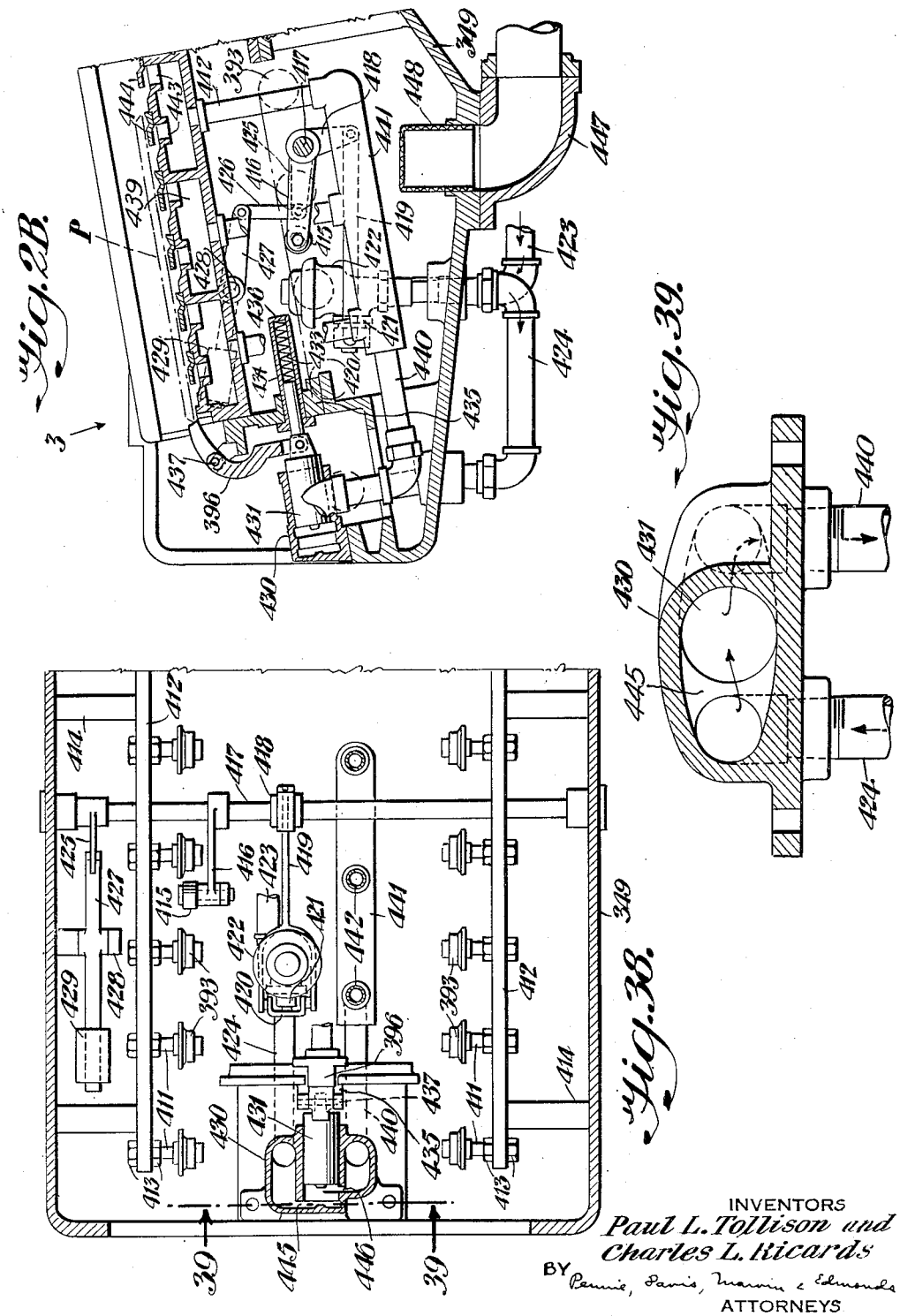

INVENTORS
Paul L. Tollison and
Charles L. Ricards
BY
Pennie, Davis, Marvin & Edmonds
ATTORNEYS

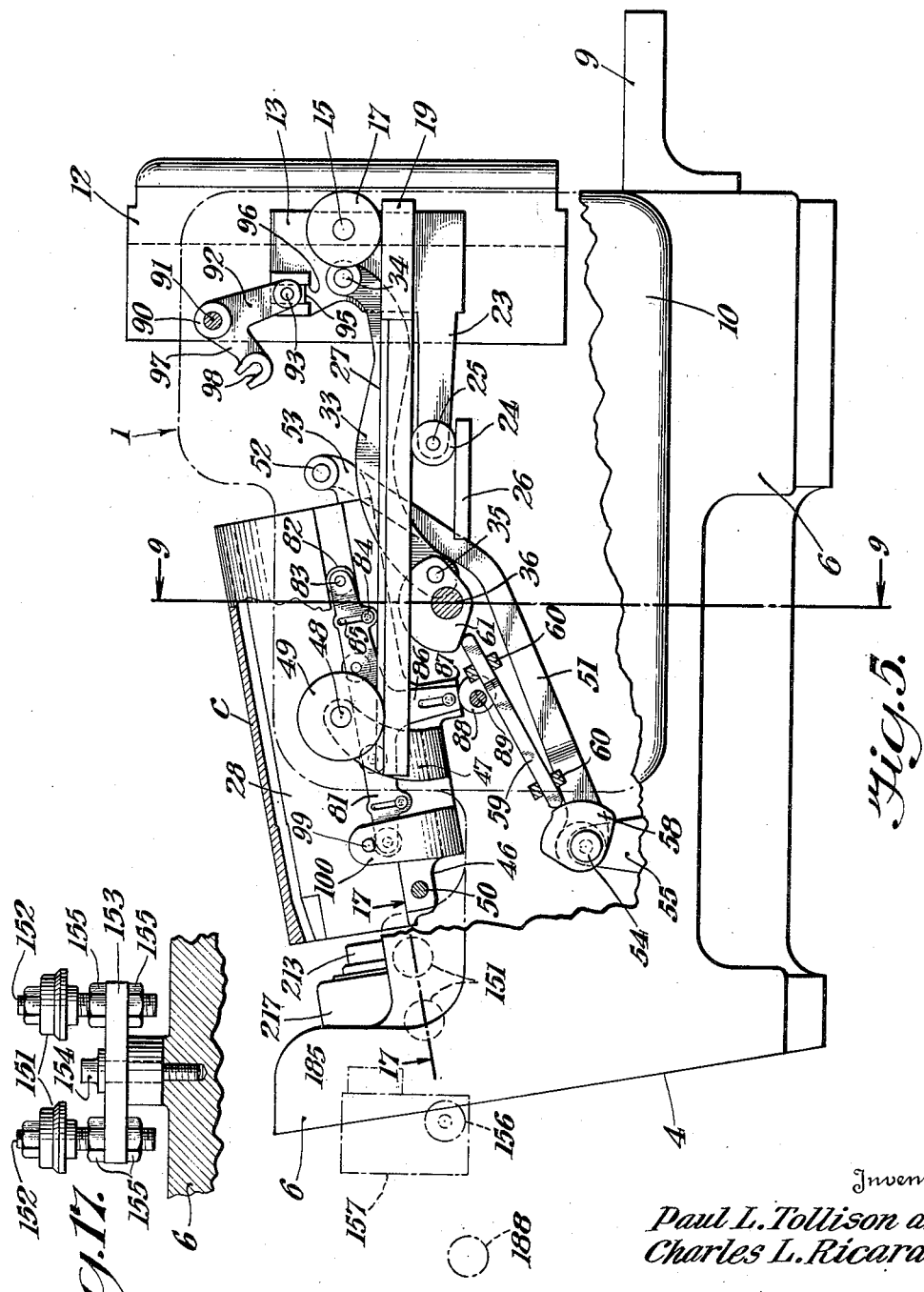

Jan. 2, 1951     P. L. TOLLISON ET AL     2,536,670
STEREOTYPE PLATEMAKING MACHINE
Filed Dec. 29, 1944     19 Sheets-Sheet 7
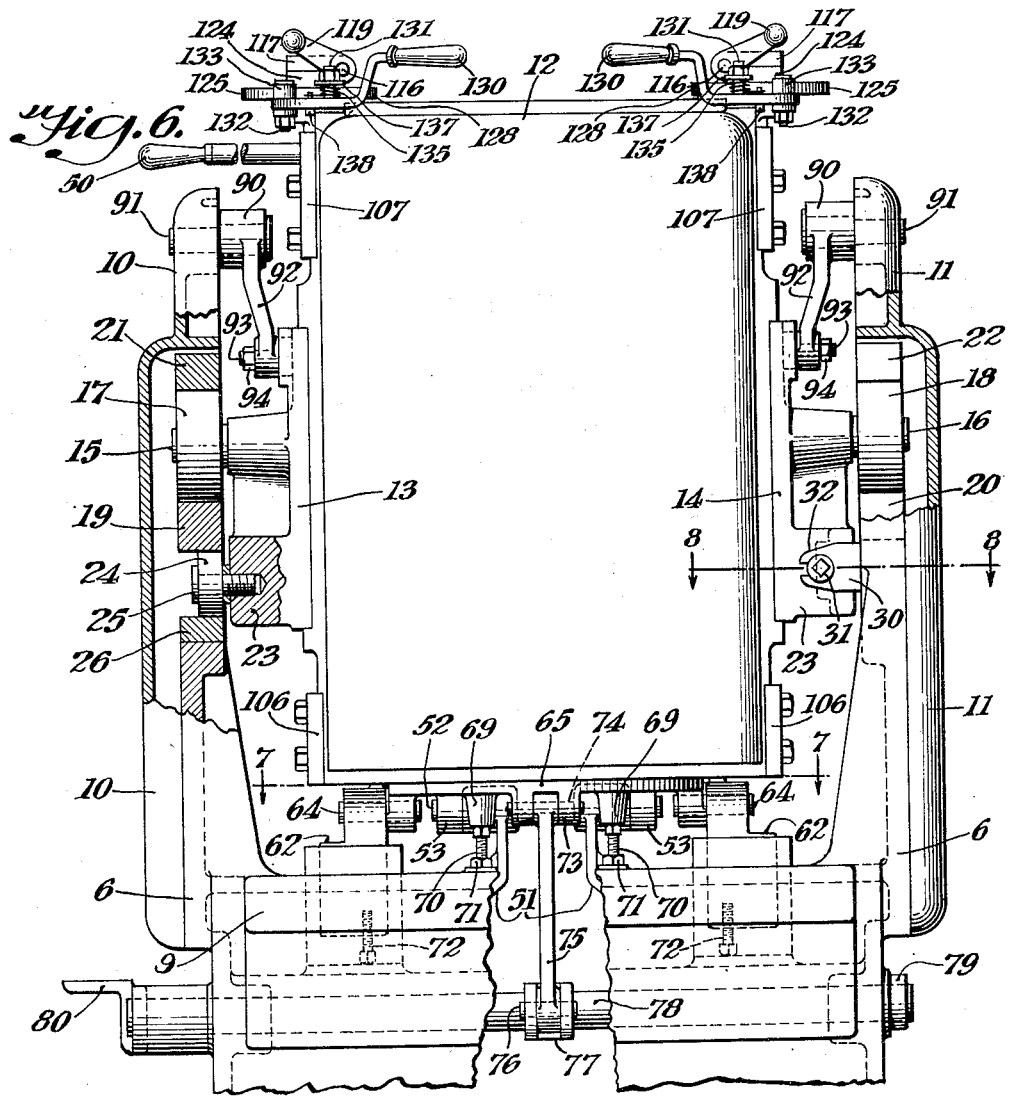
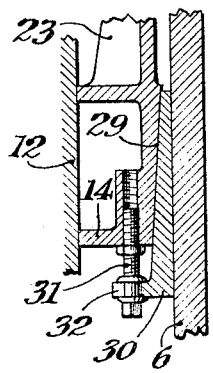
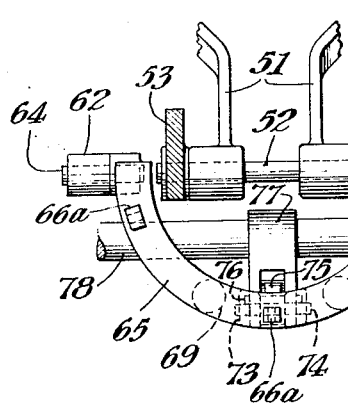
Inventors
Paul L. Tollison and
Charles L. Ricards
BY Pennie, Davis, Marvin & Edmonds
Attorneys

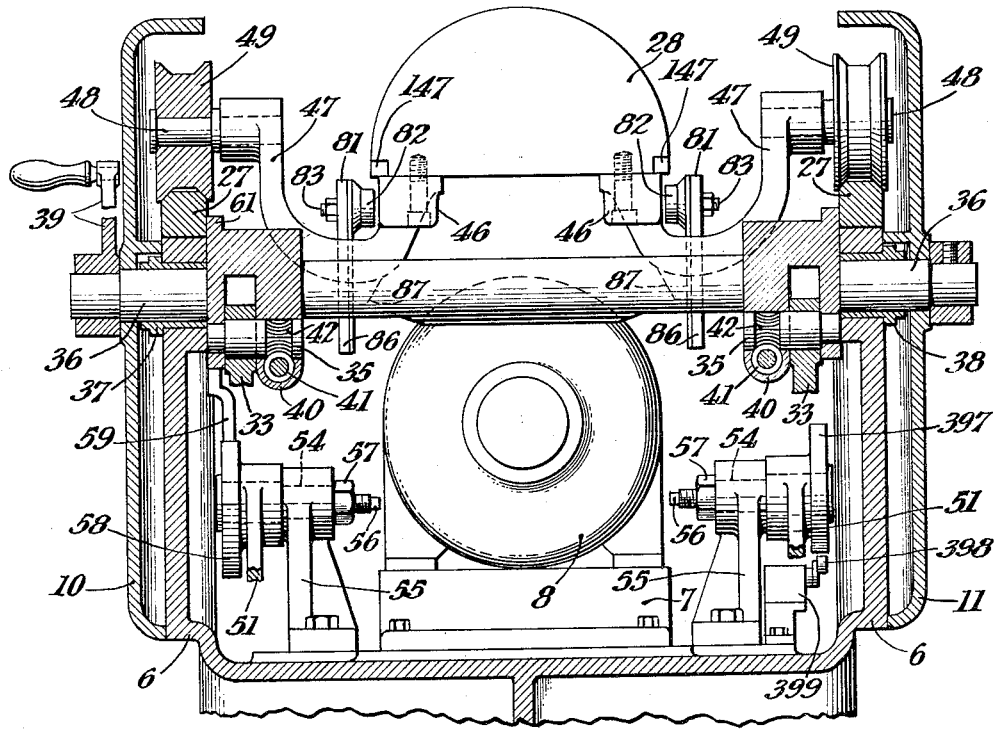

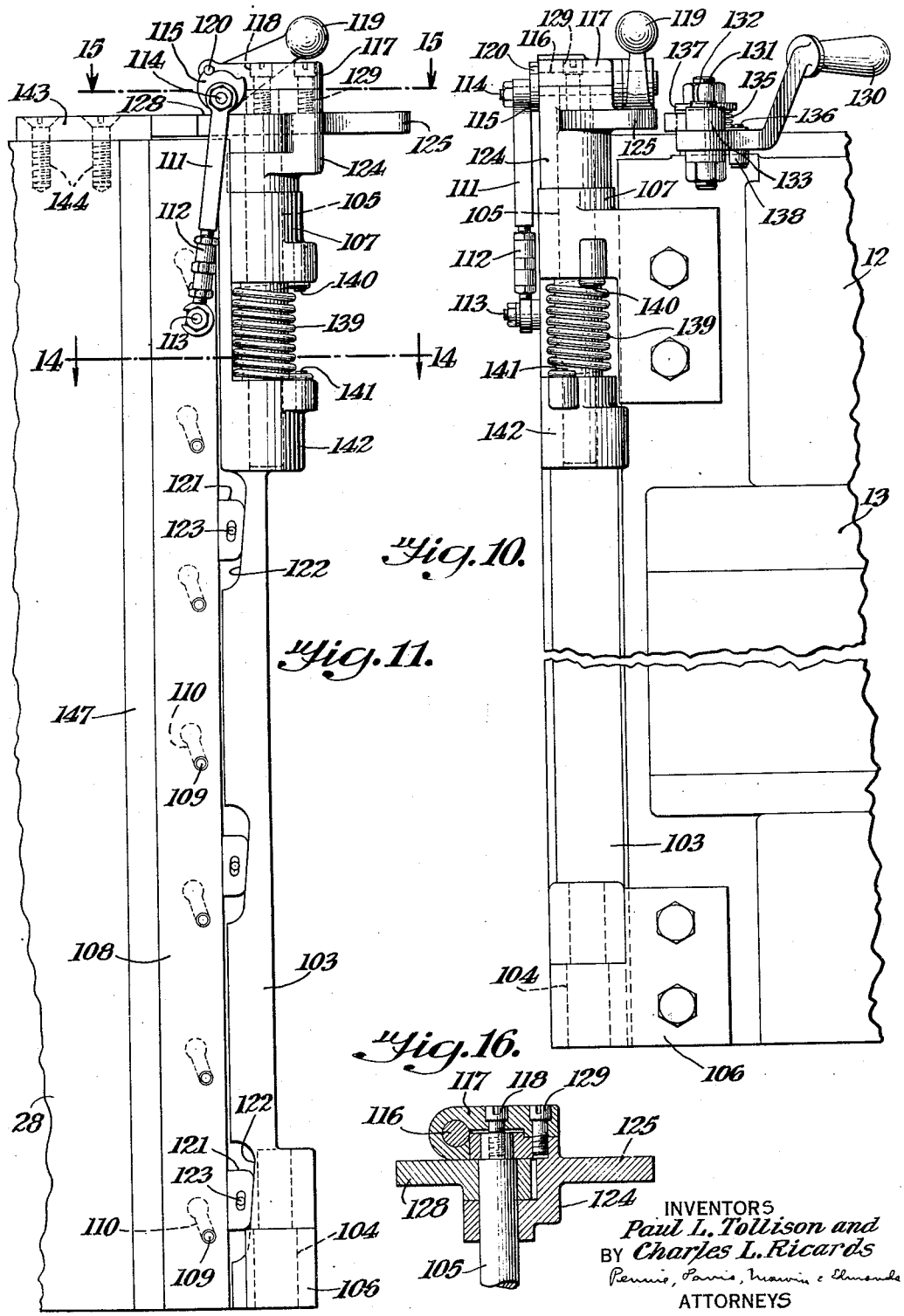

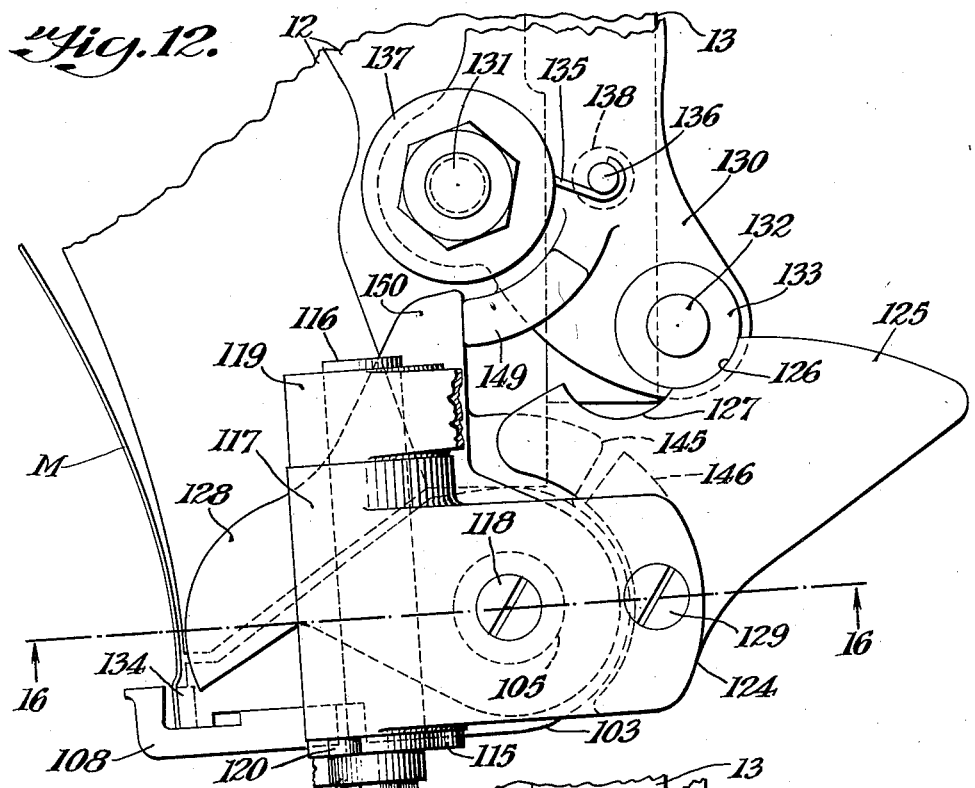
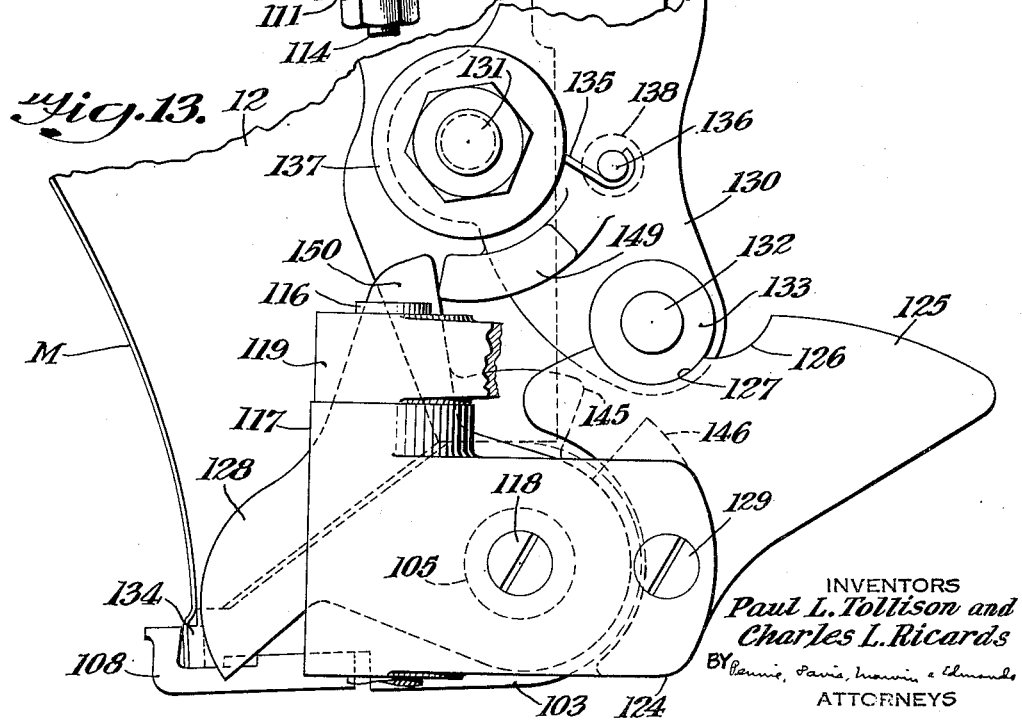

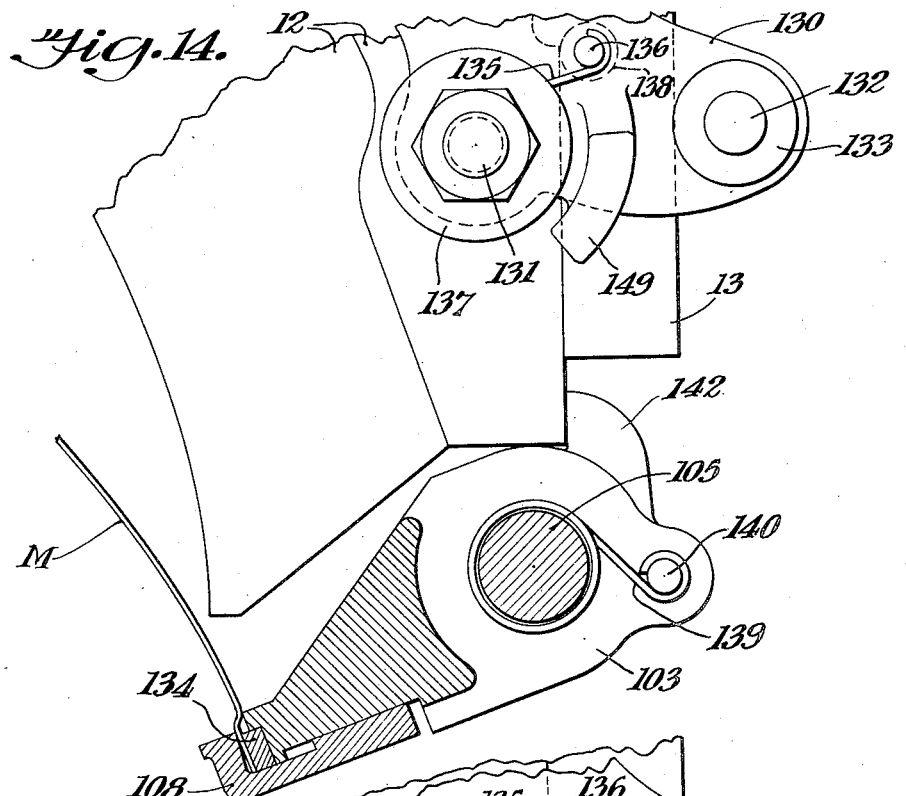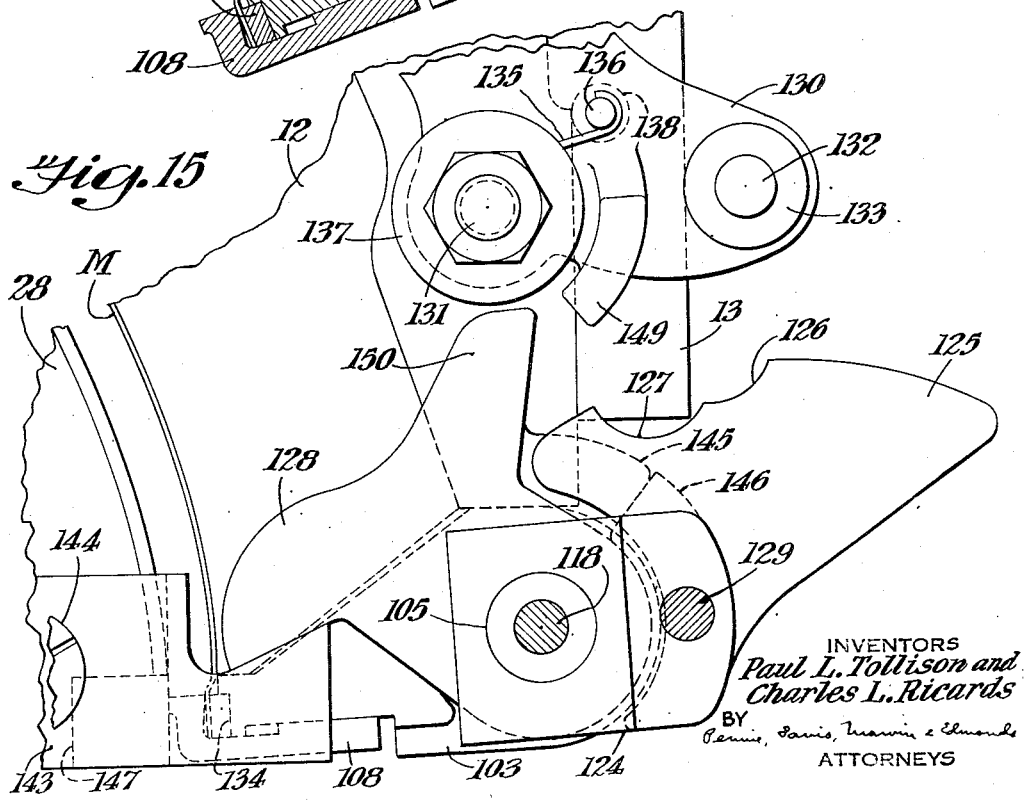

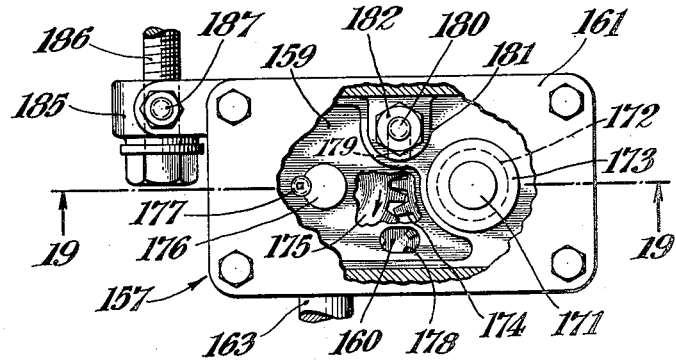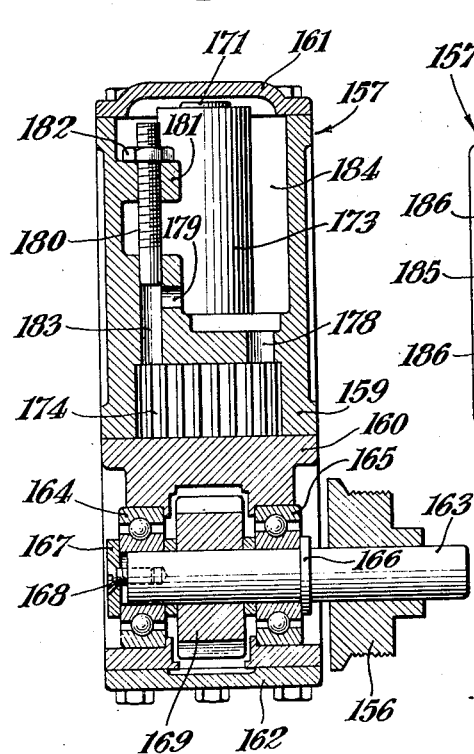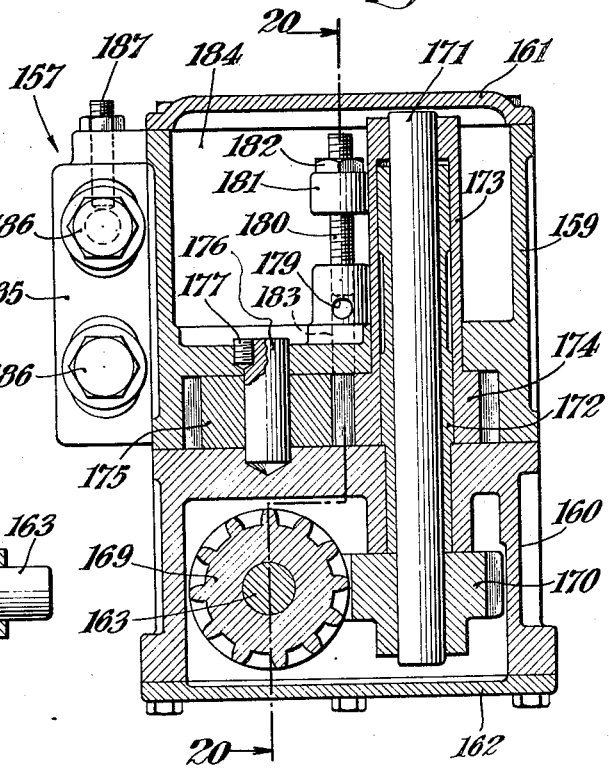

INVENTORS
Paul L. Tollison and
Charles L. Ricards
BY Pennie, Davis, Marvin & Edmonds
ATTORNEYS

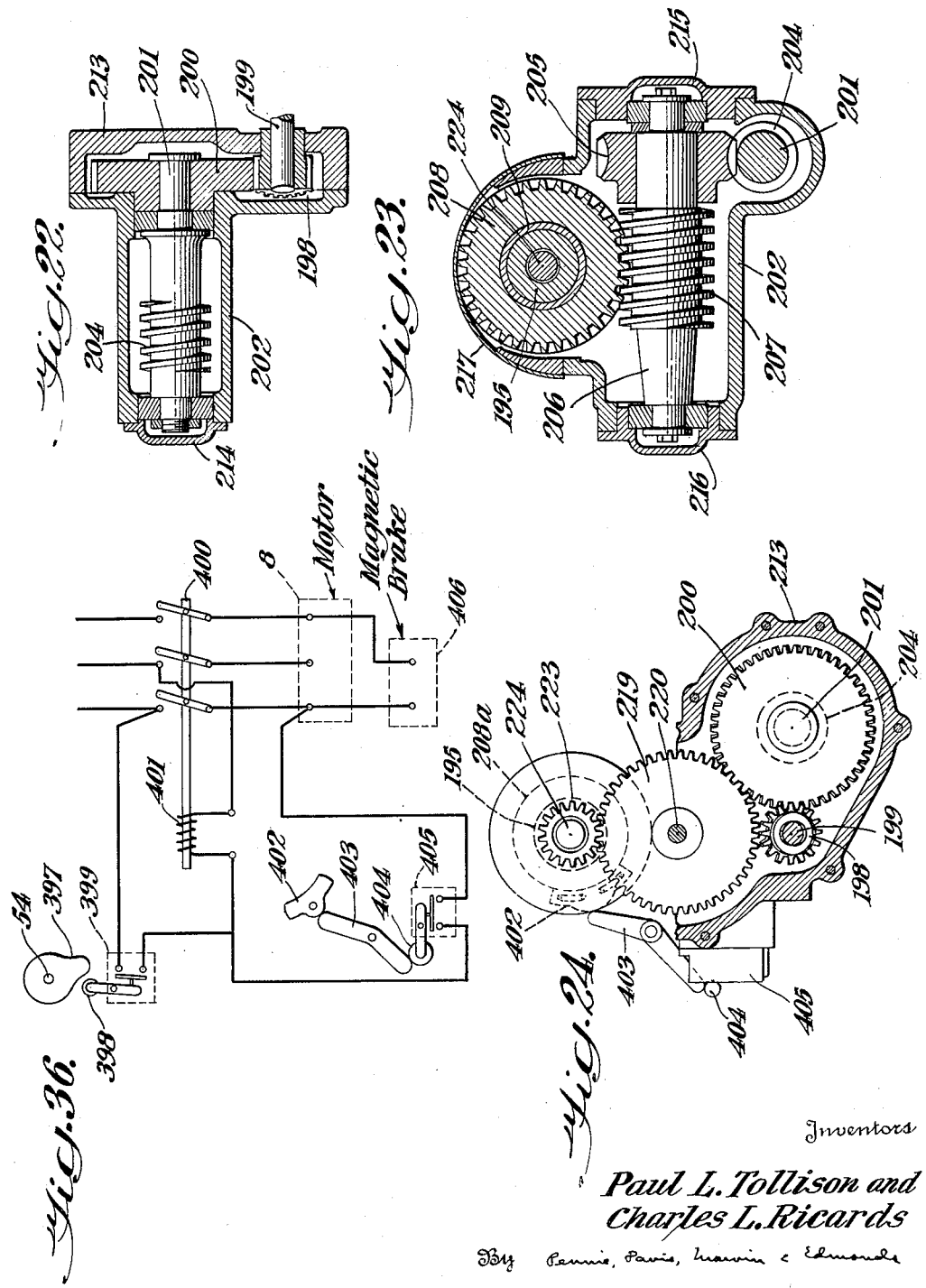

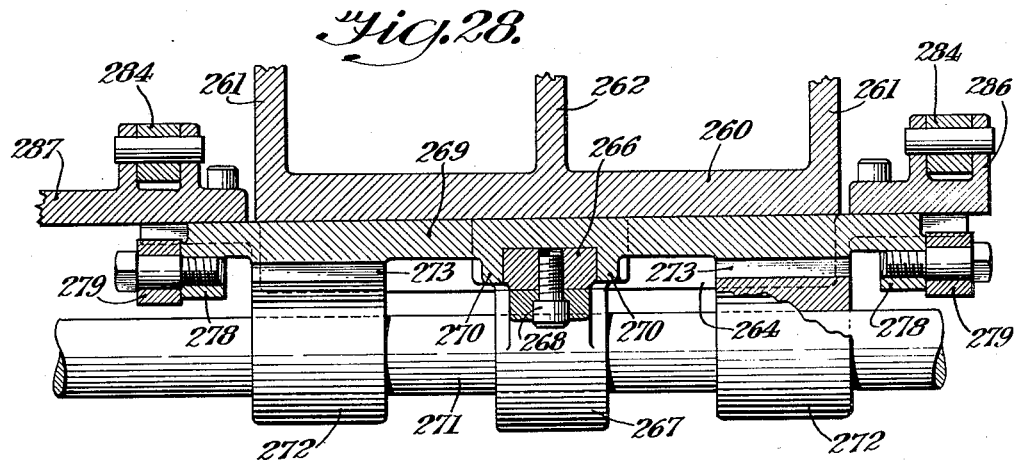
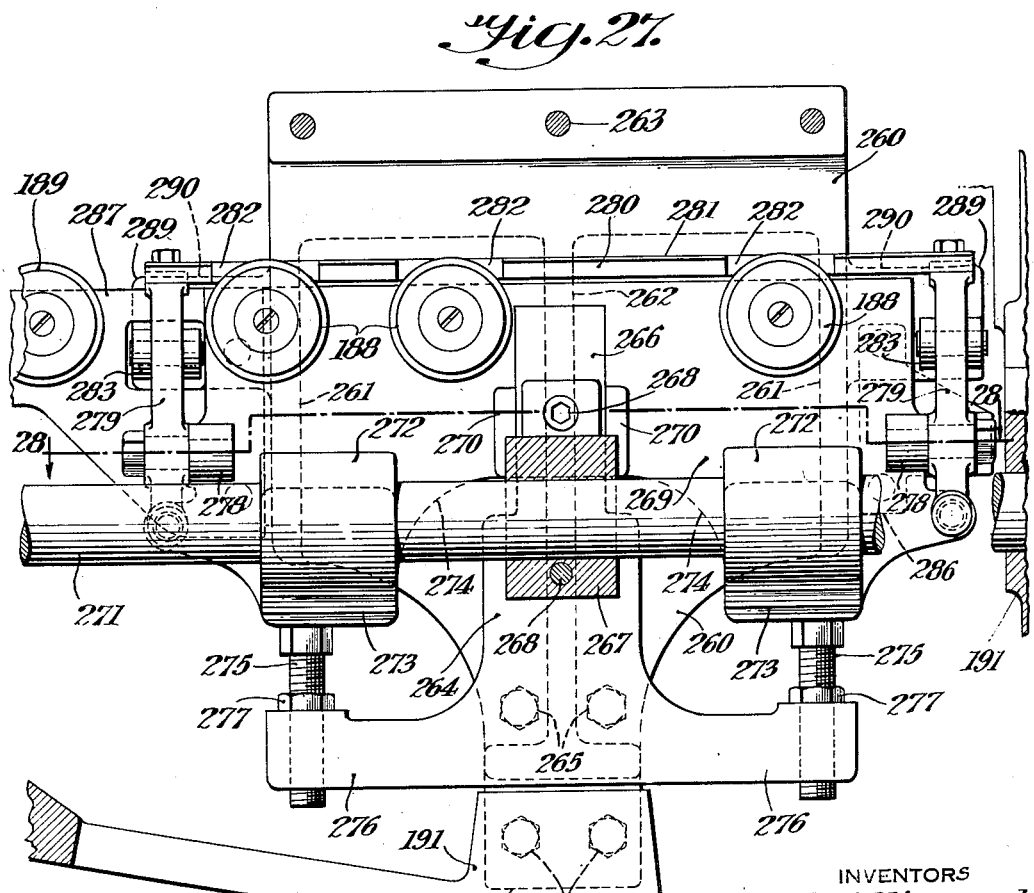

INVENTORS
Paul L. Tollison and
Charles L. Ricards
BY Rennie, Davis, Marvin & Edmonds
ATTORNEYS

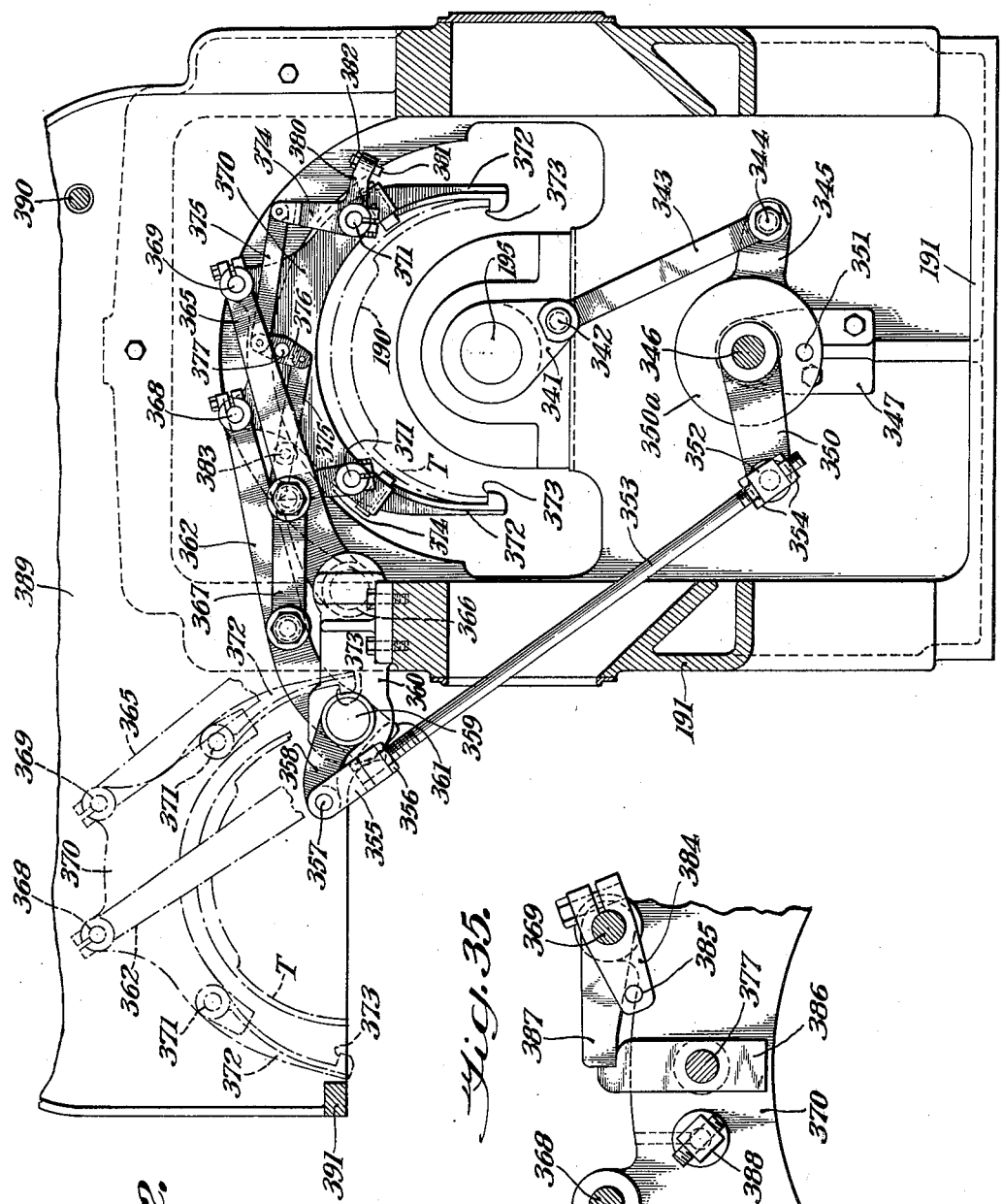

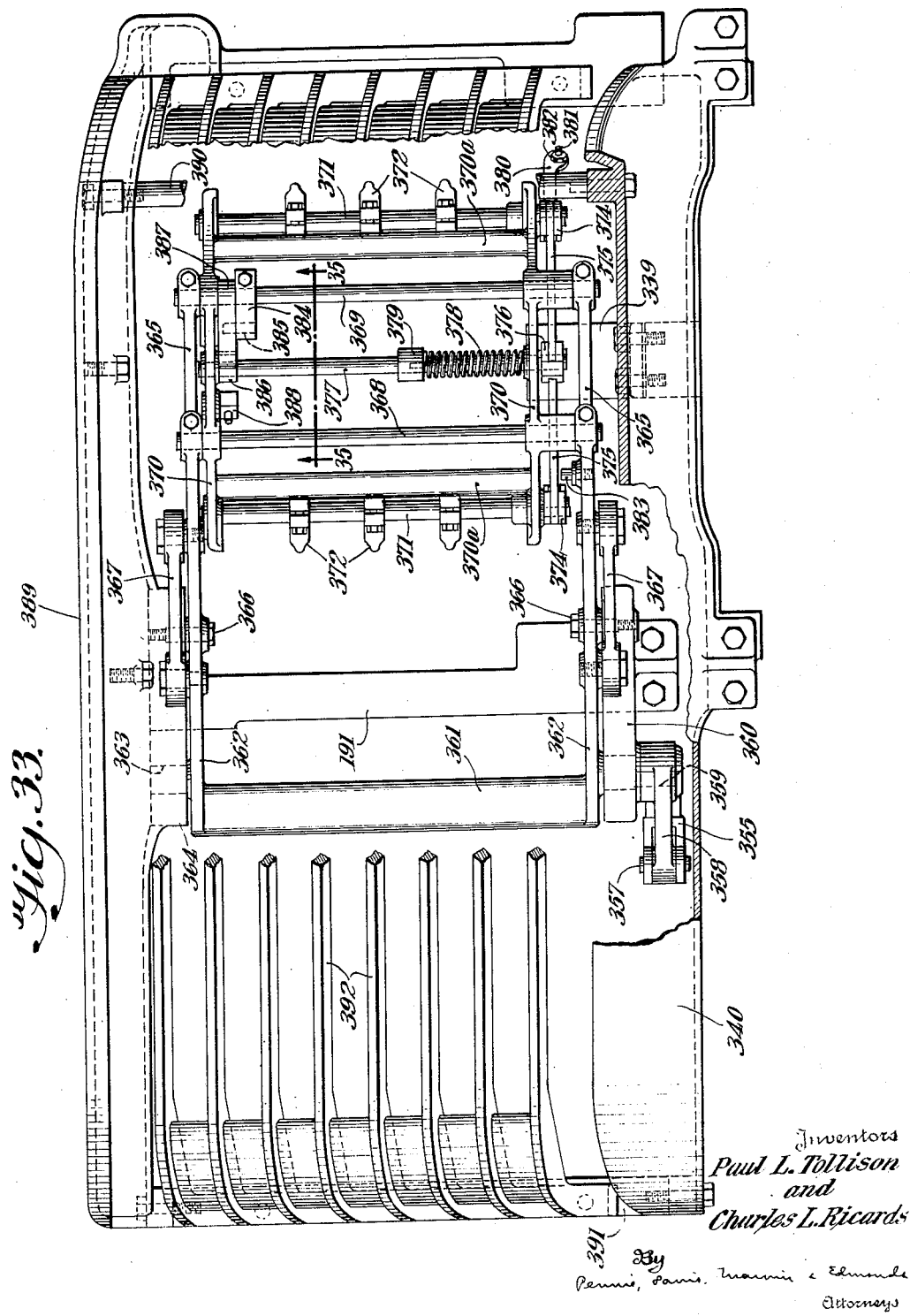

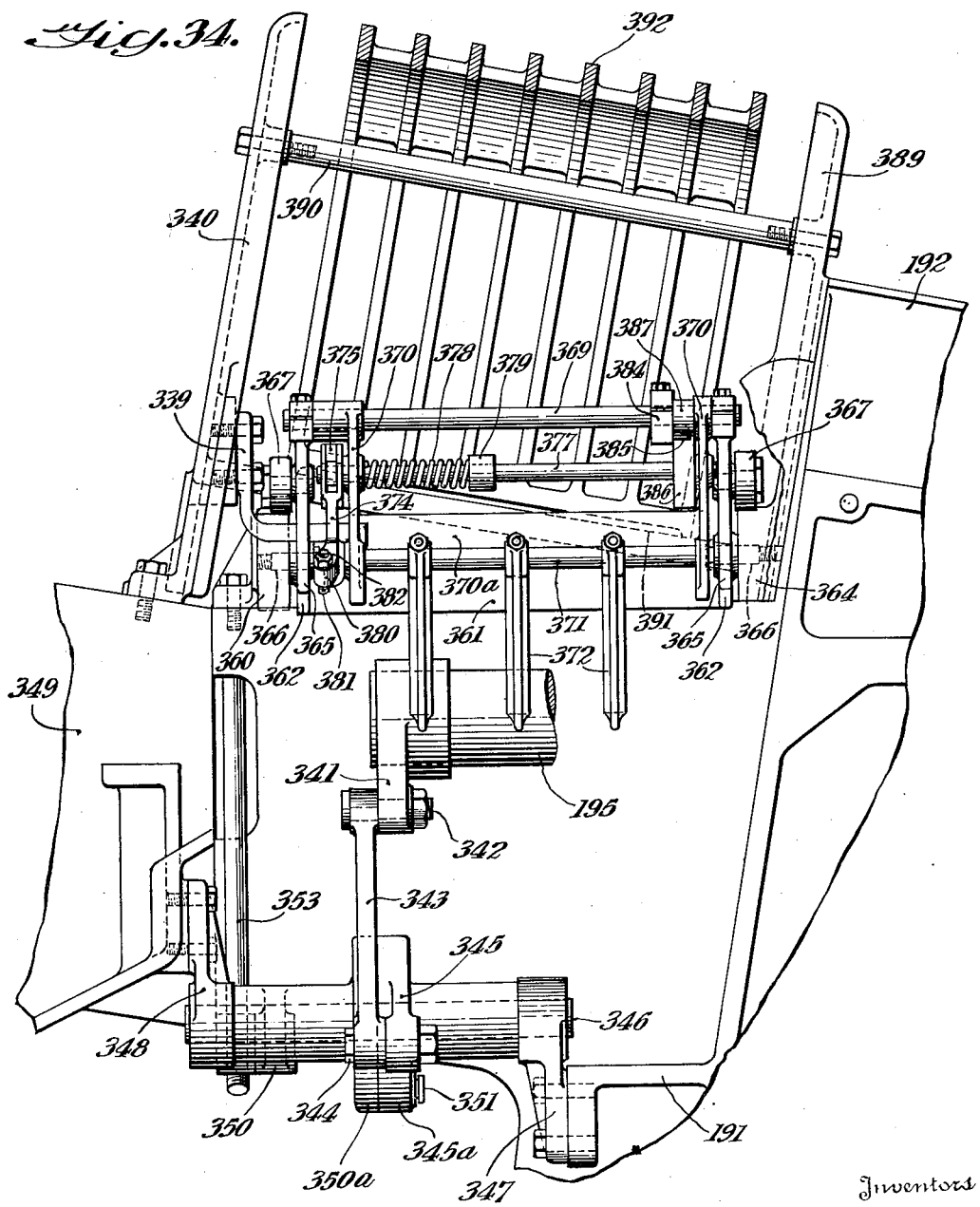

Patented Jan. 2, 1951

2,536,670

UNITED STATES PATENT OFFICE 2,536,670

STEREOTYPE PLATEMAKING MACHINE

Paul L. Tollison, North Plainfield, and Charles L. Ricards, South Plainfield, N. J., assignors to Wood Newspaper Machinery Corporation, Plainfield, N. J., a corporation of Virginia Application December 29, 1944, Serial No. 570,324

7 Claims. (Cl. 29—21)

This invention relates to an improved machine for making stereotype plates and more particularly concerns a unitary machine of this nature for successively casting, finishing, cooling, and delivering stereotype plates.

Stereotype plates for use in printing newspapers and the like are made by casting molten metal in a mold against an impression formed on a stereotype matrix, which is also known as a flong or mat. The cast plate is then finished by trimming the curved edges thereof and shaving the interior concave surface to the proper curvature. Thereafter, the finished plate is suitably cooled.

Machines of this nature in present use required either the manual transfer of the cast plate from the casting unit to the finishing unit or from the finishing unit to the cooling unit or the manual stripping of the mat from the cast plate and the subsequent replacement of the mat in the casting unit after each cast. Various other operations incident to casting and finishing the stereotype plates are also often performed manually or are subject to improper operation or failure in the hands of unskilled or inattentive operators.

In accordance with the present invention, an improved and unitary machine is provided for rapidly and successively casting, finishing, and cooling stereotype plates in a series of operations, substantially all of which are automatically initiated and completed. The machine of the invention includes (1) a manually operated, vertically disposed casting unit comprising a casting box and a core, the casting unit being operable for release of the cast plate therefrom and the core being tiltable to an inclined position for delivery of the cast plate to the finishing unit, the casting unit also including means for automatically stripping the cast plate from the mat coincidentally with the release of such plate, (2) a finishing unit including means for automatically clamping the cast plate in position for finishing, means for automatically severing the tail from the plate, means for automatically shaving the concave surface of the plate, and means for automatically releasing the finished plate for delivery to the cooling unit, and (3) a cooling unit for causing a cooling fluid to come into contact with the finished plate to cool it to the desired temperature, the finishing unit and the cooling unit together including an inclined runway down which the cast plate can slide by gravity.

Particular objects of the present invention include the provision of means to prevent movement of the casting box while the core is in its tilted, inclined position, self-operating means for retarding the movement of the plate down the inclined runway into the finishing unit and the cooling unit, means for automatically trimming or beveling both ends of the cast plate while it is clamped in the finishing unit and for trimming successive plates to the same length, automatically operated means for lifting the severed tail off the inclined runway before the finished plate is released from the finishing unit and for laterally ejecting such tail from the machine, means initiated by the tilting of the core back to its vertical position for setting into operation the several automatically operated elements of the finishing unit, and means operable by the movement of the finished plate into the cooling unit for holding the plate therein for a predetermined period and for causing a predetermined amount of cooling fluid to flow into contact with the plate while it is held in the cooling unit.

Other specific objects, advantages, and characteristic features of the invention will be apparent from the following description of a preferred embodiment thereof taken in connection with the accompanying drawings, of which:

Figure 1 is an elevation showing a general outline of the entire stereotype plate-making machine;

Figs. 2, 2A, and 2B are enlarged sectional elevations taken substantially along the center line of the machine and showing the casting unit, the finishing unit, and the cooling unit, respectively, with certain parts omitted from Figs. 2A and 2B, from the right-hand end to the left-hand end of the machine as viewed in Fig. 1, Fig. 2 showing the core and the casting box in their vertical, closed position and also showing (in dot and dash lines) the core in its tilted position and the cast plate ready for delivery to the finishing unit, Fig. 2A showing (in dot and dash lines) the cast plate clamped in position in the finishing unit, and the severed tail in position for removal, and Fig. 2B showing (in dot and dash lines) the finished plate in position in the cooling unit;

Fig. 5 is an enlarged view similar to Fig. 3, with parts in section and with certain parts omitted, and shows the casting unit with the casting box open and the core tilted forward to its inclined position for delivery of a cast plate to the finishing unit;

Fig. 6 is an enlarged end view, with parts in section and with certain parts omitted, of the casting unit as shown in Fig. 1, and shows various details of the mechanisms for opening and closing the core and the casting box and for tilting the core;

Fig. 7 is a detail view with parts in section taken along the line 7—7 of Fig. 6;

Fig. 8 is a detail sectional view taken along the line 8—8 of Fig. 6;

Fig. 9 is an enlarged sectional view taken substantially along the line 9—9 of Fig. 5 and illustrates further details of the mechanisms for opening and closing the core and the casting box and for tilting the core, the core being shown in its horizontal tilted position;

Fig. 10 is an enlarged elevation of the stereotype mat-clamping mechanism on the left-hand side of the casting box as viewed in Fig. 6;

Fig. 11 is an end view of the mat-clamping mechanism shown in Fig. 10;

Figure 21:
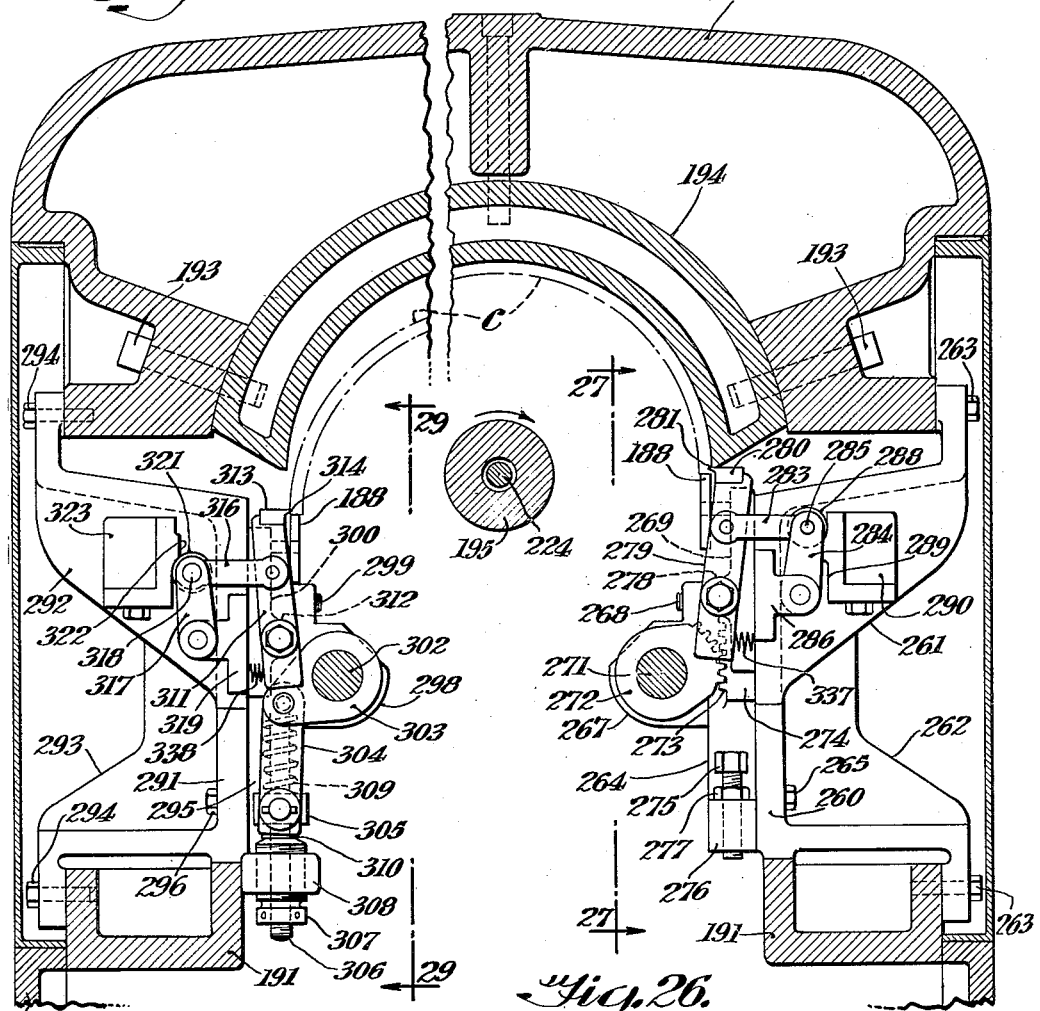
Figures 25, 26:
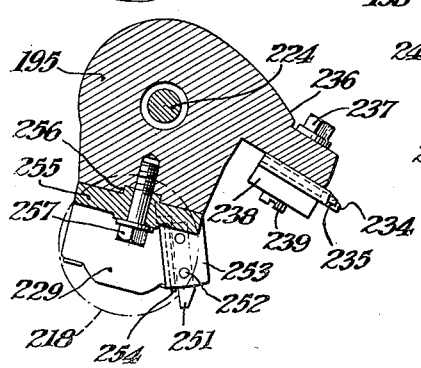
Figure 30:
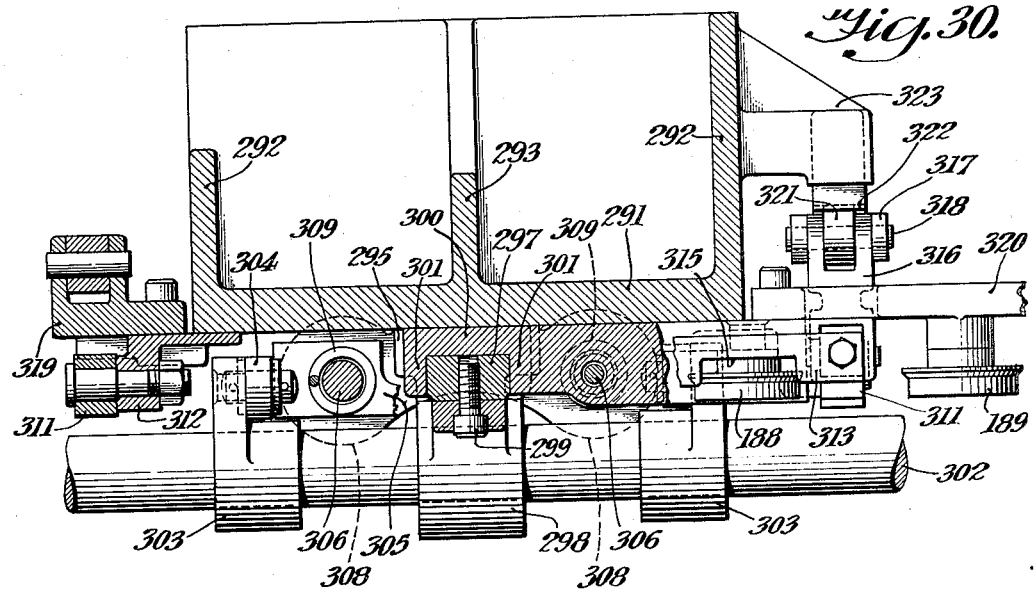
Figure 29:
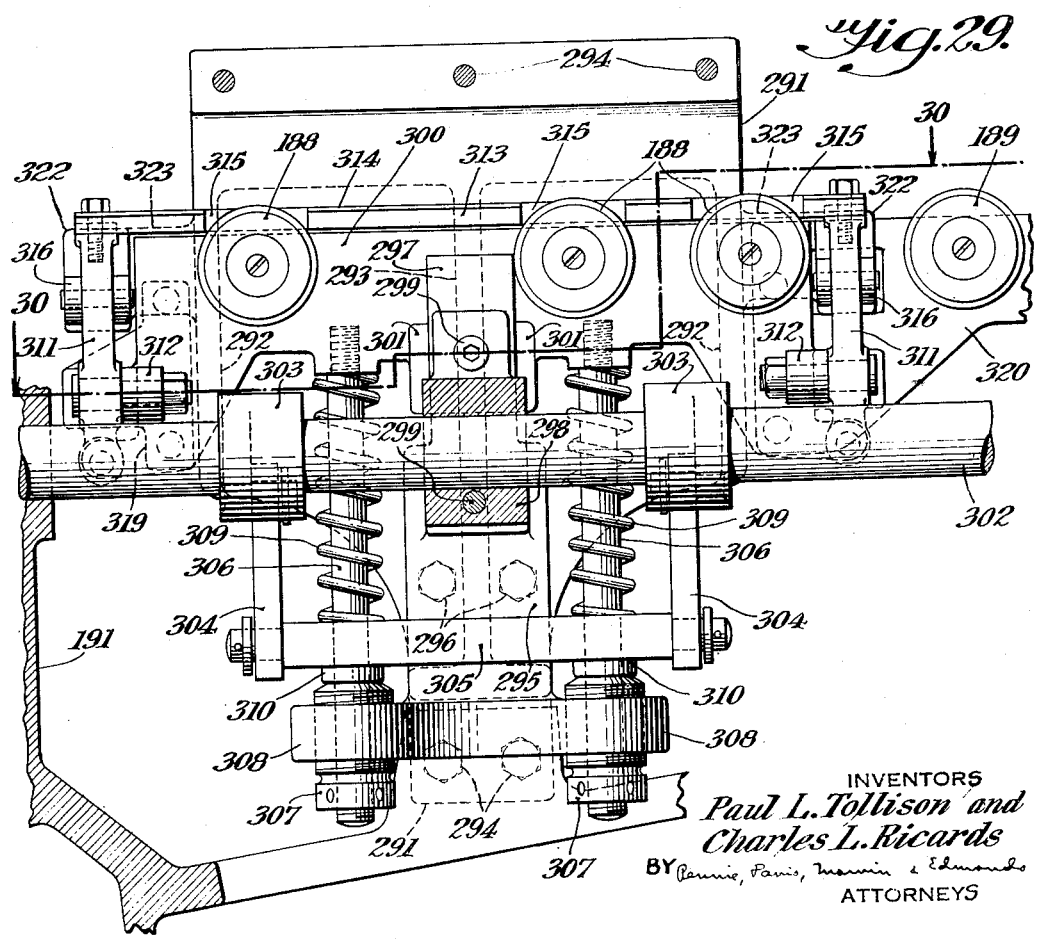

Figs. 12 to 15 are plan views, with certain parts omitted, of the mat-clamping mechanism shown in Fig. 11, Fig. 12 showing the position of this mechanism for insertion of the mat, Fig. 13 showing the position of this mechanism with the mat-clip in place, Fig. 14 showing the position of this mechanism just prior to the closing of the casting box and the core, and Fig. 15 showing the position of this mechanism when the casting box and the core have been closed, a portion of Fig. 14 being taken in section along the line 14—14 of Fig. 11 and a portion of Fig. 15 being taken in section along the line 15—15 of Fig. 11;

Fig. 16 is a small-scale detail sectional view taken substantially along the line 16—16 of Fig. 12;

Fig. 17 is an enlarged detail view with parts in section taken along the line 17—17 of Fig. 5;

Fig. 18 is a plan view with parts broken away of the holdback-roller retarding mechanism;

Fig. 19 is a sectional view taken along the line 19—19 of Fig. 18;

Fig. 20 is a sectional view taken along the line 20—20 of Fig. 19;

Fig. 21 is an enlarged sectional view with certain parts omitted taken substantially along the line 21—21 of Fig. 2A and shows the mechanism for clamping the cast plate (shown in dot and dash lines) in the finishing arch, the left-hand side of Fig. 21 showing the cast plate in its unclamped or lowered position and the right-hand side of Fig. 21 showing the cast plate in its clamped or raised position;

Fig. 22 is a sectional view taken substantially along the line 22—22 of Fig. 2A and shows a portion of the drive from the motor to the shaving-knife bar;

Fig. 23 is a sectional view taken substantially along the line 23—23 of Fig. 2A and shows the remainder of the drive to the shaving-knife bar;

Fig. 24 is a sectional view taken substantially along the line 24—24 of Fig. 2A and shows principally the drive from the motor to the tail-saw shaft;

Fig. 25 is a sectional view taken along the line 25—25 of Fig. 2A and shows the angular relation of the several plate-finishing tools;

Fig. 26 is an enlarged sectional detail view taken along the line 26—26 of Fig. 2A and shows the mechanism for arresting the movement of the cast plate through the finishing unit, the mechanism being shown in its raised position in Fig. 2A and in its lowered position in Fig. 26;

Fig. 27 is an enlarged elevation taken along the line 27—27 of Fig. 21 and shows the right-hand plate-clamping mechanism, as viewed in Fig. 21, this mechanism being shown in its raised position in Fig. 21 and in its lowered position in Fig. 27;

Fig. 28 is a sectional plan view taken along the line 28—28 of Fig. 27;

Fig. 29 is an enlarged elevation taken along the line 29—29 of Fig. 21 and shows the left-hand plate-clamping mechanism, as viewed in Fig. 21, this mechanism being shown in its lowered position in both figures;

Fig. 30 is a plan view, partially in section, taken along the line 30—30 of Fig. 29;

Fig. 31 is an enlarged view, with parts broken away, taken along the line 31—31 of Fig. 2A and shows, in its lowered position, the mechanism for raising and lowering the two plate-clamping mechanisms;

Fig. 32 is an enlarged view, with certain parts omitted, of the tail-lifting mechanism taken substantially along the line 32—32 of Fig. 2A, this mechanism also being shown (in dot and dash lines) in its tail-discharging position;

Fig. 33 is an enlarged plan view in perspective, with parts in section and with certain parts omitted, of the tail-lifting mechanism as shown in Fig. 32;

Fig. 34 is an enlarged elevation, with parts in section and with certain parts omitted, of the tail-lifting mechanism as viewed in Fig. 1;

Fig. 35 is an enlarged detail view taken along the line 35—35 of Fig. 33;

Fig. 36 is a diagram of the electric circuit for the operation of the finishing unit;

Fig. 37 is a detail view of the knife-bar bearing taken along the line 37—37 of Fig. 2A;

Fig. 38 is a sectional plan view of the cooling unit with the water chamber and certain other parts omitted to show the interior construction;

Fig. 39 is an enlarged detail sectional view taken along the line 39—39 of Fig. 38.

With reference to Fig. 1, the stereotype plate-making machine shown therein includes three principal cooperating parts, namely, the casting unit 1, the finishing unit 2, and the cooling unit 3. To facilitate manufacture and shipping of this machine, it may be divided into its three principal parts along the lines indicated at 4 and 5, but these parts are so designed as to integrally form a unitary machine. The casting unit and the finishing unit rest on the floor, and the cooling unit is attached to and supported by the finishing unit.

The casting unit 1 has a base 6, secured to which is a pedestal 7 for mounting the drive motor 8 (Figs. 2 and 9). A platform 9 is attached to this base to provide a place for the operator to stand when placing a mat in the machine. The side frames 10 and 11 are secured to opposite sides of the base 6 to provide a structure to which various parts of the casting unit may be attached.

Figure 3:
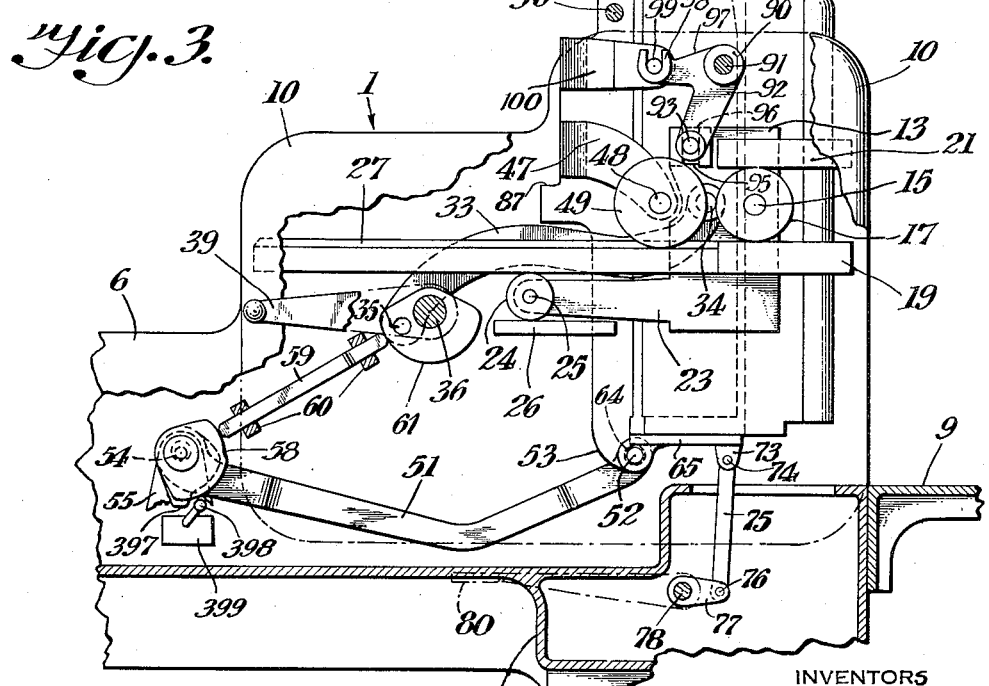
Fig. 3 is an enlarged elevation of the casting unit as shown in Fig. 1, with parts in section and with certain parts omitted, and shows the core and the casting box locked in position to receive molten metal for casting a plate.

The casting box 12 of the casting unit has the stud plates 13 and 14 secured to its opposite sides (Fig. 6). The outwardly extending studs 15 and 16 are fastened in the stud plates 13 and 14, respectively, and mount the rollers 17 and 18, which respectively ride on the flat-top tracks 19 and 20 secured to the base 6. The members 21 and 22 are attached to the side frames 10 and 11 and serve as top tracks for the casting-box rollers 17 and 18, respectively. Each stud plate carries a horizontally projecting arm 23 provided with a roller 24 mounted on an adjustable stud 25 eccentrically positioned in this arm (Figs. 2 and 3). This roller rides on a short flat-top track 26 secured to the base 6 of the casting unit and bears against an upper track 27 whereby up-and-down motion thereof is prevented. With this arrangement, the casting box 12 may be moved in a horizontal direction toward and away from the core 28 on the rollers and tracks described; and, upon adjustment of the eccentric studs 25, the casting box can be slightly tilted toward or away from a vertical position and thus easily squared up with the core.

The lower portion of each stud plate is tapered as at 29 and is fitted with a similarly tapered gib 30, one side of which bears against the stud plate and the other side of which bears against the base 6 (Figs. 6 and 8). An adjustable poppet 31 is threaded in the stud plate and has shoulders which bear against the bifurcated projection 32 of the gib 30 so that the screwing of this poppet in and out of the stud plate moves the gib relatively to this plate and so serves to move the casting box 12 to the right as viewed in Fig. 6 or to the left, as desired. The casting box can thus be adjusted sideways to the particular position desired and then locked in such position with the two gibs having just enough clearance to permit the casting box to be moved to and from the core 28 without binding. Ample provision is thereby made for setting the casting box square with the core both vertically and laterally.

A link 33 is pivoted on a stud 34 secured in the stud plate on each side of the casting box 12, the other end of each link being eccentrically pivoted on the stud 35 rotatably mounted on the crankshaft 36 (Figs. 2 and 9). The crankshaft 36 is journaled in the bearings 37 and 38 carried in the base 6 and is provided at one end with the handle 39. A bifurcated projection 40 on this crankshaft provides a split bearing for the eccentric stud 35, and mounted therein at right angles to this stud is a worm 41 that meshes with a worm wheel 42 formed integrally with the eccentric stud 35 at one end thereof. The worm 41 may be operated by means of the square 43 provided on the end thereof. When this worm is suitably turned, the eccentric stud 35 is rotated through the worm wheel 42, and the necessary adjustments to place the casting box 12 at the desired distance from the core 28 are thereby made, the casting box having been previously squared up in the manner already described. After this setting has been made, the worm 41 may be locked in position by means of the lock nuts 44 and 45, whereby the split bearing around the eccentric stud 35 is also clamped together.

As shown in Figs. 2 and 9, a bracket 46 is secured to each side of the back of the core 28 along substantially its full height. A projection 47 on each such bracket 46 carries a stud 48, which is located in substantially the central portion of the core and on which is rotatably mounted a roller 49 having beveled flanges. These rollers ride on the tracks 27, which are beveled along their upper surface and which are secured to the base 6 of the casting unit. As indicated in the drawings, these tracks 27 are in line with the flat-top tracks 19 and 20. A handle 50 secured to one of the brackets 46 permits the operator to move the core 28 along the tracks 27 and to tilt it about its center of gravity by reason of the position of the studs 48. The beveled edges of the tracks 27 and the cooperating flanges on the rollers 49 prevent any substantial side motion of the core during such retraction. The rollers 49 never roll to the right (as viewed in Fig. 2) sufficiently to touch the tracks 19 and 20, and the rollers 17 and 18 on the casting box 12 never roll forward to the left sufficiently to contact the tracks 27.

An arm 51 is secured to each end of a shaft 52 which is pivoted in the extensions 53 of the brackets 46 secured to the back of the core (Figs. 2 and 8). These arms serve to guide the core while it is being tilted. The other end of each arm 51 is secured to a stud 54 which is pivoted in a bracket 55 mounted on the base 6. Each stud 54 is provided with a square 56 by means of which it may be moved to the desired location, and the stud can then be locked in place by the lock nut 57. By means of this arrangement, the core 28 can be adjustably moved horizontally to the desired position for proper cooperation with the casting box 12.

It is essential that the core be in its vertical position when the casting box is brought to the closed position in order that neither part be damaged. To prevent such improper operation, there is provided, in accordance with the present invention, a cam 58 attached to one of the arms 51 to operate an inclined follower rod 59 mounted in the slide brackets 60 secured to the base 6 of the casting unit (Figs. 3, 5, and 9). This rod 59 is free to be pushed upwardly by the cam 58 and to fall back by gravity. In the vertical, closed position of the core and the casting box as shown in Fig. 3, the rod 59 rests against the low portion of the cam 58 and clears a cam 61 carried by the crankshaft 36. When the core is tilted to its plate-discharging position as shown in Fig. 5, the rod 59 is pushed up by the high portion of the cam 58, and the upper end thereof lies in the path of the cam 61 and prevents movement of the crankshaft 36. With the crankshaft 36 thus locked, the casting box can not be moved from the open position shown in Fig. 5 to the closed position shown in Fig. 3 while the core remains in its tilted position. This arrangement prevents damage to the respective parts and insures proper operation of the machine.

A pair of brackets 62 (Figs. 2, 6, and 7) is adjustably secured to the base 6 by the bolts 63, each bracket carrying a pivot stud 64 on which the ring support 65 is pivotally mounted. A half-segment ring 66 is secured to the lugs 66a of the ring support 65 by a series of bolts 67 and forms a base or support on which the core 28 rests when it is in the vertical position. The segment ring 66 is formed with a recess 68 as shown so that a beveled edge can be subsequently formed on the finished plate for use in clamping it on a printing press. The lugs 69 on the ring support 65 abut the screws 70, which are carried in the base 6 of the casting unit and provide an adjustable stop for the ring support, the height of which can be suitably adjusted thereby. The lock nuts 71 are provided for the screws 70. Adjustment of the pivot studs 64 vertically is accomplished by loosening the bolts 63 and jacking up the brackets 62 as desired by means of the screws 72.

The ring support 65 has a bifurcated projection 73 carrying a stud 74, which is pivotally attached to one end of a link 75, the other end of this link being pivoted on a stud 76, which in turn is secured to the crank arm 77 held fast on the shaft 78. The shaft 78 is pivotally mounted in the base 6 of the casting unit and carries a collar 79 on one end and a treadle 80 on the other end. End motion of the shaft is thus prevented, and a foot treadle is provided to assist the operator in tilting the core and the cast stereotype plate away from the vertical position. When the operator grasps the handle 50 and steps on the treadle 80, both the ring support 65 and the core 28 tilt forward. After a limited movement, however, the core leaves the ring support and the segment ring 66 mounted thereon and travels to the position shown in Fig. 5, where the cast plate C is ready to enter the finishing unit.

A bracket 81 is slidably mounted in each bracket 46 on the sides of the core 28 and carries the rollers 82 rotatably secured thereto by suitable studs 83 (Figs. 2 and 5). Each bracket 81 is slidably secured to each bracket 46 by the studs 84, which extend through the slots 85 in each bracket 81 and are screwed into each bracket 46. Each bracket 81 also has an extension 86 having a tongue fitting into a complementary groove on the extension 87 of each bracket 46. This arrangement prevents tilting of the bracket 81 with reference to the core but still permits straight-line movement of the bracket 81 toward and away from the core. When the core is tilted to the position shown in Fig. 5, the extension 86 on each sliding bracket 81 comes into contact with a stop 88 eccentrically mounted on a stud 89 extending inwardly from the base 6 of the casting unit. This contact of the brackets 81 with these stops 88 serves to push them upwardly with reference to the core as it reaches its tilted or inclined position, whereby the rollers 82 are brought into contact with the edge of the cast plate C and break the plate away from the core. The height of stops 88 can be suitably adjusted by reason of their eccentric mounting. At this point, the plate is ready to roll off the rollers 82 into the finishing unit.

When the core and the casting box are moved to their closed position to form the mold for the production of a cast plate, it is essential that these two parts be locked securely together before the molten metal is poured into the mold. To accomplish this purpose, there is provided on each side of the casting unit a locking mechanism that includes the bell crank 90 pivotally mounted on the stud 91 secured to the respective cover plates 10 and 11 (Figs. 2, 3, 5, and 6). The arm 92 of each bell crank 90 has on its end a stud 93 locked in position by the lock nut 94. The stud 93 projects into a sliding block 95, which fits into a groove 96 in the respective stud plates 13 and 14 and is free to slide vertically therein. With this arrangement, when the casting box is moved toward and away from the core, the sliding block 95 serves to oscillate the bell crank 90. The other arm 97 of each bell crank has an open slot 98 for cooperation with a stud 99 secured in the extension 100 of the bracket 46 attached to the core 28. When the casting box is brought from the right, as viewed in Fig. 5, with the core in the vertical position, the open slot 98 embraces the stud 99 and thereby securely locks the core and the casting box together. The stud 99 is desirably so mounted in the extension 100 that a limited amount of adjustment thereof may be obtained.

Figure 4:
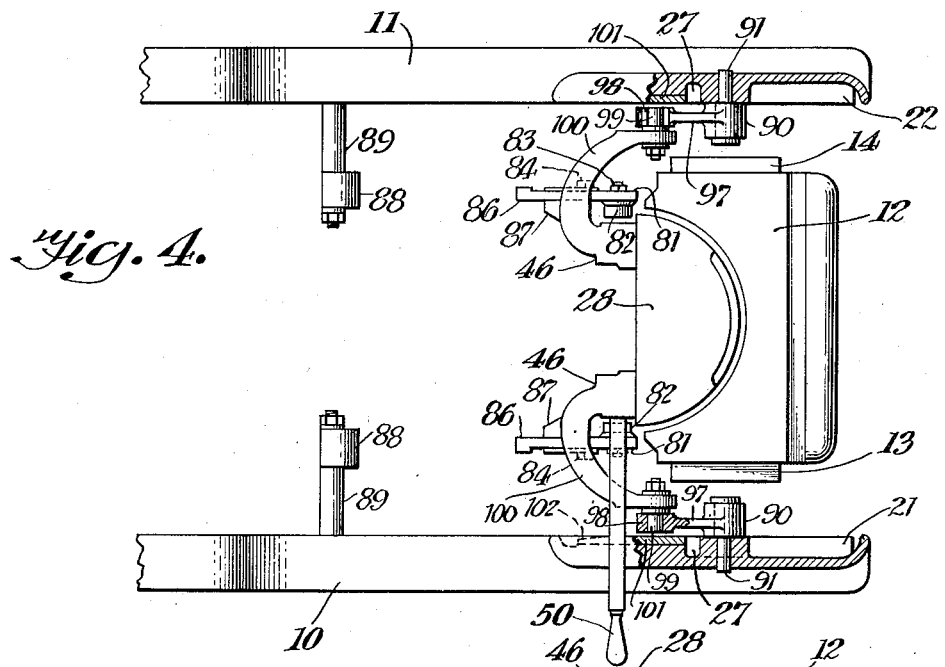
Fig. 4 is a plan view, with parts in section and with certain parts omitted, of the casting unit as shown in Fig. 3.

Each stud 99 serves a dual purpose in that, when the core is lifted to its vertical position, this stud also slides against a guide plate 101, which is secured to the respective cover plates 10 and 11 (Fig. 4). This guide plate is tapered, as shown at 102 so that the end of the stud 99 can freely engage it. By suitably shimming each guide plate to the proper height to contact the stud 99, the core can be guided to an accurate position sidewise as it is brought to the vertical.

The mechanism for clamping the stereotype mat in place in the casting box and for preventing improper operation of the casting box and the core is shown in Figs. 10 to 16; Figs. 12 to 15 showing the position of the mechanism in successive stages of preparing the casting unit for operation. This mechanism includes the mat bar 103, which extends vertically along the front edge of each side of the casting box 12 and is pivotally secured thereto by the studs 104 and 105, respectively, carried in the mat-bar brackets 106 and 107 secured to the casting box. A mat clip 108 extends along the mat bar 103, overhanging its edge as shown, and is secured thereto by the studs 109 which slide in the angularly disposed slots 110 in the mat bar. An adjustable link 111, provided with the turnbuckle 112 for adjustment, is pivotally secured at one end to the mat clip 108 by the stud 113; the other end thereof being secured to an eccentric stud 114, which is rotatably mounted in the bracket 115 fixed to one end of the stud 116. This stud 116 is rotatably mounted in the bracket 117, which is fixed to the stud 105 by the screw 118 so as to turn with the mat bar 103 and the mat clip 108.

A handle 119 is provided on the other end of the stud 116 so that the mat clip 108, after the mat has been inserted therein as described hereinafter, can be moved from its open position, shown in Fig. 12, to its closed position, shown in Figs. 11 and 13. The stop 120 fixed in the bracket 117 serves to limit the rotation of the stud 116. The tapered wedges 121 fixed to the outer edge of the mat clip 108 fit against the cooperating tapered shoulders 122 of the mat bar 103 and serve as stops for this edge of the mat clip when the mat clip is in the closed or locked position, as shown in Fig. 13. The position of these wedges may be changed as desired by means of the adjustable studs 123.

A bifurcated bracket 124 provided with the projection 125 having the two notches 126 and 127 along one of its edges is secured to the stud 105. Loosely mounted on the stud 105 between the bifurcations of the bracket 124 is the locking toe 128. The bifurcated bracket 124 is secured to the bracket 117 by the screw 129 so as to oscillate with the mat bar 103 and the mat clip 108. The locking toe 128, however, has a limited amount of motion relative to the stud 105. A locking handle 130 is pivoted on the casting box 12 by a stud 131. An eccentric stud 132 is secured in one end of the locking handle 130 and carries the roller 133, which cooperates with the notches 126 and 127 on the projection 125.

In the preparation of the casting unit for operation, the casting box 12 and the core 28 are first moved into their retracted positions as shown in Fig. 5. The locking handles 130 on each side of the casting box are then moved to bring the rollers 133 thereon into cooperation with the notches 126 in the projections 125 of the bifurcated brackets 124 so that the mat bars 103 are thereby pivoted about the studs 104 and 105 into a position slightly open with respect to the casting box (Fig. 12). In this position of the mat bars 103, the mat clips 108 are also open, and the mat M is inserted therein. The locking handles 130 are then moved again so that the rollers 133 thereon are brought into cooperation with the notches 127 on the projections 125; and the mat bars 103 are thereby brought into a closed position with respect to the casting box and press the mat M firmly against the casting box (Fig. 13). The mat clips 108 are now closed by movement of the handles 119 to clamp the mat M firmly against the bolster packing strips 134 mounted in the bat bars 103.

The locking handles 130 are now moved out of engagement with the projections 125 (Fig. 14). Surrounding the studs 131, on which these locking handles are pivoted, are the springs 135 fastened at one end to the studs 131 and on the other end to the pins 136 carried in the respective locking handles. The washers 137 on the studs 131 keep the springs 135 in place. These springs tend to keep the locking handles in the position shown in Fig. 14, and the stops 138 secured to the pins 136 come in contact with the sides of the casting box and limit the motion of the locking handles in this direction. The springs 139 on the respective studs 105 are fastened at one end to the pins 140 mounted in the mat-bar brackets 107 and at the other end to the pins 141 mounted in the extensions 142 of the mat bars 103 and tend to turn these mat bars into the fully open position shown in Fig. 14 when the locking handles 130 are disengaged from the projections 125. The extensions 142 come into contact with the sides of the casting box and limit the opening of the mat bars 103. The mat M, which is clamped in the mat clips 108, assumes the flexed position shown in Fig. 14 when the mat bars 103 are opened, this flexing of the mat also serving to strip it from the cast plate in the subsequent operation of the apparatus.

The casting box and the core may now be assembled without damage that might otherwise occur to the mat M. As these two members are brought to their closed position, the locking cams 143, secured to the top of the core by the screws 144, engage the locking toes 128, each of which is provided with the projection 145 that engages a corresponding projection 146 on the respective bifurcated brackets 124; and the mat bars 103 are thereby rotated to their closed casting position, as shown in Fig. 15, with the mat M pressed tightly against the casting box.

The casting unit is now ready for the production of a cast plate. The filling-in pieces 147 positioned in the edges of the core press against the edge of the respective mat clips 108 and, together with the adjustable screws 148 (Fig. 2) carried in the brackets 46, which screws press against the respective mat clips 108 near the bottom thereof, serve to provide a leakproof casting mold. Any attempt to bring the locking handles 130 into engagement with the projections 125 of the bifurcated brackets 124 when the casting box and the core are in the closed position of Fig. 15 is prevented by the prior contact of the projections 149 on the locking handles with the projections 150 on the locking toes 128.

When the cast plate C has been brought to the position shown in Fig. 5 and has been separated from the core, it travels by gravity into the finishing unit down an inclined runway formed by the several rollers hereinafter referred to. In such travel, the edges of the cast plate first come into contact on each side of the machine with a pair of idler rollers 151 (Figs. 5 and 17) rotatably mounted on the studs 152 adjustably carried in the small bracket 153, which is itself adjustably bolted to the side wall of base 6 of the casting unit as by the bolt 154. Upon loosening of this bolt 154, the bracket 153 may be adjusted up or down in order to accommodate the rollers 151 to the particular size of the plate being made. The studs 152 may be moved in toward or out from the center line of the machine upon loosening of the lock nuts 155 locking these studs in position on the bracket 153.

The edges of the cast plate C next come into contact on each side of the machine with the holdback rollers 156 that retard and control, by means of the self-actuated retarding mechanisms 157 associated therewith, the speed at which the cast plate progresses down the inclined runway. The purpose of these mechanisms 157 is to reduce the speed of the moving cast plate sufficiently so that it does not crash against the plate stops 158 (Fig. 2A), hereinafter referred to, with damaging force. These retarding mechanisms are made self-actuated because the drive motor 8 is not running at this particular point of the plate-producing operation, as will become apparent later, and, hence, there is no positively rotated part in motion from which the holdback rollers 156 can be driven.

Each retarding mechanism 157 includes a frame having an upper part 159, a lower part 160, and the covers 161 and 162 secured thereto, respectively, the parts 159 and 160 being suitably fastened together (Figs. 18 to 20). The holdback roller 156, which may have a knurled surface as shown, is secured to a shaft 163 which is mounted in the ball bearings 164 and 165 in the lower part 160. The shoulder 166 on the shaft 163 serves, together with the washer 167 and the screw 168, to hold this shaft against end motion. A spiral gear 169 is carried on the shaft 163 and meshes with a spiral gear 170 secured to the vertical shaft 171. A bushing 172 is pressed into the lower part 160 and forms a bearing for the shaft 171, the upper end of which is secured to the hub 173 of a gear 174 formed integrally therewith. The gear 174 meshes with the gear 175 rotatably mounted on a stud 176 which fits in holes in the upper and lower parts 159 and 160 and is secured therein by the set screw 177.

The gears 174 and 175 comprise essentially a gear pump, the inlet of which is shown as the opening 178 and the outlet as the opening 179. A screw 180 is threaded in the lug 181 in the upper part 159 and is provided with the lock nut 182. The lower end of the screw 180 serves as a plunger or valve plug operating in the vertical hole 183 which cooperates with the outlet 179. By adjustment of the vertical position of the screw 180, it can be made to close off a portion or all of the outlet 179. The arrangement of this device is such that the gear 175 rotates in a clockwise direction as viewed in Fig. 18. A suitable liquid such as oil is carried in the reservoir 184 and is drawn in through the inlet 178 and forced out through the restricted outlet 179 under control of the screw 180.

The cast plate C, when it comes into contact with the knurled holdback roller 156, rotates this roller and, through the gearing just described, rotates the gears 174 and 175. The degree of restriction of the outlet 179 determines the speed at which the cast plate is permitted to rotate the knurled roller 156. By suitably setting the screw 180, the desired speed at which the cast plate enters the finishing unit can be controlled.

A projection 185 on the upper part 159 can be used for securing this retarding mechanism to the base of the machine as by the bolts 186. The adjusting screw 187 is provided to bear against the upper bolt 186 and to give minute adjustment of the height of the entire retarding mechanism when it is desired to elevate or lower the holdback roller 156.

The edges of the cast plate then serially come into contact with the rollers 188 and the rollers 189, and the cast plate rolls down the inclined runway until the projection 190 thereon comes into contact with the plate stops 158 (Fig. 2A), whereby the plate is brought to rest in the proper position for being lifted into the finishing unit. When the cast plate is clamped in the finishing unit as hereinafter described, the rollers 188 support that part which becomes the finished plate, and the rollers 189 support that part which becomes the tail.

The finishing unit 2 consists principally of a main frame 191, the top part of which is arch-shaped and the bottom part of which forms the base for the unit (Figs. 2A and 21). Secured to the arch 192 of the finishing unit by the bolts 193 is the liner 194, against which the cast plate is clamped for finishing and which is machined to the curvature of the finished plate. When the cast plate has been clamped in the arch 192, it is then concentric with the axis of the shaving-knife bar 195, which is mounted in the frame 191 by an upper bearing 196 and a lower bearing 197 that form the main support therefor.

The drive for the knife bar 195 and its associated mechanism includes the pinion 198, which is carried on the shaft 199 of the motor 8 and meshes with the gear 200 secured to the shaft 201 (Figs. 22 and 23). The shaft 201 is rotatably mounted in the bracket 202, which is secured to the main frame 191 of the finishing unit as by the bolts 203. This shaft 201 has formed integrally therewith a worm 204, which meshes with the worm wheel 205 secured to the shaft 206 supported in the bracket 202. The shaft 206 likewise has formed integrally therewith a worm 207, which meshes with a worm wheel 208 rotatably mounted on a hub 209 fixed to the knife bar 195. The worm wheel 208 has a flange 210 adjacent a similar flange 211 of the hub 209 and is connected thereto by the shear pin 212. Thus, the knife bar 195 is driven by the motor 8 through the gear train including the shear pin 212 just described. The cover plates 213 and 214 as well as the cover plates 215 and 216 and the cover plate 217 serve to enclose this gear train.

The saw 218, which severs the tail T from the cast plate, is also driven from the motor 8. The drive for this purpose includes the gear 200 driven by the pinion 198, as already explained, such gear meshing with an intermediate gear 219 rotatably mounted on a stud 220 carried in the bracket 221 and the cover plate 213 (Figs. 2A and 24). The gear 219 in turn meshes with a pinion 223 secured to the end of the shaft 224, which is axially mounted in the center of the knife bar 195.

A pinion 226 is secured to the lower end of the shaft 224 and meshes with an intermediate gear 227 rotatably mounted on a jack shaft 228 carried in the knife bar 195. Mounted in the bracket 229 secured to the knife bar 195 is the shaft 232 carrying the gear 233 and the saw 218. The gear 233 meshes with the intermediate gear 227, and thus a drive is obtained from the motor 8 to rotate the saw 218 as it revolves around with the knife bar 195.

The saw 218 is so placed that it will sever the tail T from the cast plate and leave the plate ready to be beveled by a beveling tool 234 and to have its concave inner surface shaved by the knife 235 (Fig. 25). This knife 235 is adjustably secured to the longitudinal projection 236 of the knife bar 195 by the bolts 237, and the beveling tool 234 is adjustably held in place by the clamp 238, which is secured to the knife-bar projection 236 by the bolt 239. A suitable receptacle 240 is provided below the rotating knife 235 to catch the shavings from the cast plate. The hinged doors 241 are provided to permit removal of the receptacle 240 for emptying thereof.

As already indicated, the cast plate C slides down the inclined runway until it is brought to rest within the finishing unit by contact of its projection 190 with the plate stops 158. These plate stops are carried by a plate-stop bracket 242, which is slidably mounted between a cam 243 and a guide plate 244, both secured to the knife bar 195 (Figs. 2A and 26). The plate-stop bracket 242 is U-shaped and is slipped over the hub 244a of the guide plate 244. Removably secured to the lower end of this plate-stop bracket 242 is another U-shaped bracket 245, which is guided by a stud 246 secured to the frame of the finishing unit whereby, when the plate stops 158 are moved up and down, they travel in a straight line, the plate-stop bracket 242 being guided by the hub 244a of the guide plate 244 as well as by the stud 246. The tension springs 247 are secured at their lower ends to the bracket 245 and at their upper ends by the pins 248 to the lower knife-bar bearing 197, the two springs being positioned on opposite sides of the knife bar 195. The plate stops 158 are urged upwardly by these springs 247, which keep the roller 249 rotatably mounted on the stud 250 affixed in the bracket 245 against the cam 243, so that the plate stops are raised to arrest the movement of the cast plate within the finishing unit and are lowered to permit the finished plate to roll into the cooling unit.

The cast plate, when it slides down the inclined runway within the finishing unit, is still hot and somewhat plastic. As a result, the impact of the projections 190 on the cast plate against the plate stops 158 causes a depression in these projections, the depth of which depression depends on the operating conditions governing the production of each cast plate. The result is that successive plates may be positioned slightly differently with respect to the saw 218 and the beveling tool 234 whereby finished plates of varying length are obtained. Such slight variation in plate length is undesirable when the finished plates are clamped on printing cylinders, particularly those equipped with quick lock-up devices, and is also disadvantageous in color printing in that it is difficult to obtain proper register of the finished plates and considerable time is lost in the make-ready.

To overcome this difficulty, the recess 68 in the ring 66 (Fig. 2) is so designed as to leave excess metal along the lower end of the cast plate, and a second beveling tool 251 is provided on the knife bar 195 for producing a bevel along this lower end of the cast plate (Figs. 2A and 25). This second beveling tool 251 is clamped by means of the screws 252 in the split bracket 253 provided with the adjusting screw 254 for precise adjustment of this beveling tool with respect to the finishing arch 192. The tongued projection 255 of the split bracket 253 fits into a complementary groove 256 in the knife bar 195, to which this split bracket is fastened by the bolts 257. A longitudinal adjusting screw 258 bearing against the block 259 bolted to the knife bar 195 is also provided for lengthwise adjustment of the split bracket when the bolts 257 are loosened.

In operation, this second beveling tool 251 is adjusted longitudinally to the desired extent with respect to the other beveling tool 234, the longitudinal position of which is fixed. These beveling tools then trim successive cast plates to the same length regardless of the depth of the depression made in the projections 190 of each cast plate.

The mechanism for clamping the cast plate C in the arch 192 is shown in Figs. 2A, 21, and 27 to 30, the plate-clamping mechanism on the right-hand side of the finishing unit (as viewed in Fig. 21) being shown in its down position in Figs. 27 and 28 and that on the left-hand side of the machine also being shown in its down position in Figs. 29 and 30. The plate-clamping mechanisms are designed to pinch the edges of the cast plate together as the plate is lifted into the arch and then to release the plate within the arch so that the plate is held firmly against the arch. The purpose of this operation is to prevent burnishing of the edge portions of the cast plate as it is lifted into the arch. The plate-clamping mechanisms on each side of the finishing unit are substantially the same except that, on the right-hand side (as viewed in Fig. 21), a rack-and-gear arrangement is provided and, on the left-hand side, a spring arrangement is provided, the rack-and-gear mechanism being designed to absorb the thrust arising from the shaving operation.

With reference to the right-hand plate-clamping mechanism, a bracket 260 having the end webs 261 and the central web 262 is secured to the frame 191 of the finishing unit by the bolts 263. A slide bracket 264 is secured to the bracket 260 by the bolts 265 and is provided with the upwardly extending projection 266, to which is secured the bearing 267 by the bolts 268. The slide 269, on which the right-hand set of the rollers 188 (as viewed in Fig. 21) is mounted, is provided on its face with the parallel projections 270 that engage the projection 266 of the slide bracket 264, on which the slide 269 is adapted to move in a vertical direction. Movement of this slide 269 is effected by rocking of the shaft 271, to which are secured the segment gears 272 that engage the racks 273 on the downwardly extending projections 274 of the slide. The rock shaft 271 is journaled in the bearing 267 and in the frame 191 of the finishing unit. The adjustable stops 275 secured in the oppositely extending lower projections 276 of the slide bracket 264 by means of the lock nuts 277 limit the downward movement of the slide 269.

Pivotally secured in the projection 278 on each side of the slide 269 are the pinching arms 279, the upper ends of which carry the pinching bar 280. The upper edge of the inner surface of this pinching bar is provided with the flange 281 for gripping the edge of the cast plate, and this inner surface is also recessed as indicated at 282 for accommodation of the rollers 188. A link 283 is pivoted at one end to the upper portion of each pinching arm 279 and is pivotally connected at its other end to an arm 284 by the stud 285. The other end of each arm 284 is also pivotally mounted, the right-hand arm (as viewed in Figs. 27 and 28) being mounted in the bracket 286 secured to the slide 269 opposite the right-hand projection 278 and the left-hand arm being mounted in the bracket 287 secured to the left-hand side of the slide 269. The bracket 287 mounts the right-hand set of the rollers 189 (as viewed in Fig. 21). A cam follower 288 is mounted on each stud 285 and contacts the cam track 289 secured to the projection 290 extending outwardly from the respective web 261.

The left-hand plate-clamping mechanism is similar to the right-hand mechanism just described. The bracket 291 having the end webs 292 and the central web 293 is secured to the frame 191 of the finishing unit by the bolts 294. A slide bracket 295 is secured to the bracket 291 by the bolts 296 and is provided with the upwardly extending projection 297, to which is secured the bearing 298 by the bolts 299. The slide 300, in which the left-hand set of the rollers 188 (as viewed in Fig. 21) is mounted, is provided on its face with the parallel projections 301 that engage the projection 297 of the slide bracket 295, on which the slide 300 is adapted to move in a vertical direction.

Movement of the slide 300 is accomplished by rocking of the shaft 302, which is journaled in the bearing 298 and in the frame 191 of the finishing unit and to which are secured the crank arms 303. These crank arms are each pivotally secured at their outer ends to the upper ends of the links 304, the lower ends of which are pivotally secured to the crossbar 305. Passing through this crossbar are the guide rods 306, the upper ends of which are threadedly secured to the slide 300 and the lower ends of which are provided with the adjustable stops 307 threadedly mounted in the respective lower projections 308 of the slide bracket 295. A compression spring 309 is carried by each rod 306 between the slide 300 and the crossbar 305. The adjustable stops 307 limit the downward movement of the slide 300 by their contact with the collars 310 secured to the guide rods 306.

A pinching arm 311 is pivotally secured in the projection 312 on each side of the slide 300. The upper ends of these pinching arms carry the pinching bar 313, the upper edge of the inner surface of this bar being provided with the flange 314 for gripping the edge of the cast plate, this inner surface also being recessed as indicated at 315 for accommodation of the rollers 188. A link 316 is pivoted to the upper portion of each pinching arm 311, the other end of each link 316 being pivotally connected to an arm 317 by the stud 318. Each arm 317 is pivotally mounted at its lower end, the left-hand arm (as viewed in Figs. 29 and 30) being mounted in the bracket 319 secured to the slide 300 opposite the left-hand projection 312 and the right-hand arm being mounted in the bracket 320 secured to the right-hand side of the slide 300. This bracket 320 mounts the left-hand set of the rollers 189 (as viewed in Fig. 21). On each stud 318 is mounted a cam follower 321 that contacts the cam track 322 secured to the projection 323 extending outwardly from the respective web 292.

The rock shafts 271 and 302 that respectively operate these plate-clamping mechanisms are driven from the knife bar 195, to which are secured the cams 324 and 325 provided with the hubs 326 and 327, respectively (Figs. 2A and 31). These cams are similar in shape but are positioned in a staggered relation to each other. Carried by each of the rock shafts 271 and 302 is an arm 328, in which the stud 329 is mounted by means of the adjustable screws 330. Pivotally mounted on each stud 329 is a yoke 331, to which is secured the cam follower 332 that engages the respective cam 324 or 325. The bifurcated end of each yoke is in continuous contact with the respective cam hub 326 or 327 as indicated in Fig. 31. Each arm 328 is also provided with the poppet 333, which is oscillatably secured thereto. Each poppet slidably engages a rod 334, the lower end of which is pivotally secured to the base 191 of the finishing unit and is provided with the collar 335. A spring 336 is carried by each rod, the lower end of the spring abutting the collar 335 and the upper end being in contact with the poppet 333. These springs serve to keep the cam followers 332 always in contact with the cams 324 and 325.

When the knife bar 195 is rotated, oscillatory motion is thereby imparted to the rock shafts 271 and 302. Both plate-clamping mechanisms are thereby moved upwardly simultaneously and clamp the cast plate against the arch liner 194. During this upward movement, the pinching bars 280 and 313, which engage the respective edges of the cast plate, force these edges inwardly and then release them when the plate has been moved into the arch through the corresponding movement imparted thereto by contact of the cam followers 288 and 321 with their respective cams 289 and 322. In this manner the cast plate is firmly positioned within the arch 192 ready for finishing, and possible damage to the plate during the upward movement is avoided. When the finished plate is removed from the arch, its edges, which are still engaged by the respective pinching bars 280 and 313, are again forced inwardly and then released when the plate-clamping mechanisms have been returned to their lowered positions. To insure continuous contact of the cam followers 288 and 321 with their respective cams 289 and 322, a compression spring 337 is attached to the lower end of each pinching arm 279, these springs 337 also being attached to the corresponding brackets 286 and 287, and a compression spring 338 is attached to the lower end of each pinching arm 311, these springs 338 also being attached to the corresponding brackets 319 and 320 (Fig. 21).

When the cast plate has been clamped in place in the finishing arch 192, the tail portion T is severed therefrom by rotation of the saw 218 and, after disengagement of the plate stops 158 from contact with the projection 190 of the cast plate, rolls down the inclined sets of rollers 189 until it comes into contact with the stop 339 attached to the end plate 340 of the finishing unit (Fig. 2A). The tail is then engaged by a tail-lifting mechanism, which lifts it off the rollers 189 over the left-hand side of the finishing unit (as viewed in Fig. 32) onto a truck, for example, for return thereof to the stereotype metal-melting pot (not shown).

This tail-lifting mechanism is also driven from the knife bar 195, to the lower end of which is secured the arm 341 (Figs. 2A and 32 to 34). Pivotally secured to this arm 341 by the pin 342 is one end of a link 343, the other end of which is also pivotally secured by the pin 344 to an arm 345 oscillatably mounted on the shaft 346. This shaft is rigidly fixed in the bracket 347 secured to the frame 191 of the finishing unit and in the bracket 348 secured to the frame 349 of the cooling unit 3. Also oscillatably mounted on this shaft 346 is the arm 350, the flange 350a of which is connected to the flange 345a of the arm 345 by a shear pin 351. In the event of a jam or improper operation of the tail-lifting mechanism, this shear pin will break and thereby prevent damage to the mechanism. A poppet 352 is oscillatably mounted in the arm 350 and is pierced by the rod 353, the jam nuts 354 being provided on each side of the poppet to hold the rod against longitudinal motion. The upper end of the rod 353 is secured to a bifurcated extension 355 and is provided with the jam nut 356 for adjustment of the effective length thereof. The bifurcated extension 355 of the rod 353 carries the stud 357 secured to the arm 358, the other end of which is in turn secured to the stud 359. This stud 359 is rotatably mounted in the bracket 360 fastened to the frame 191 of the finishing unit.

The tail-lifting mechanism itself includes the crossbar 361 having the parallel arms 362, one of which is secured to the stud 359 rotatably mounted in the bracket 360 and the other of which is provided with the integral stud 363 rotatably mounted in the bracket 364 also fastened to the frame of the finishing unit. Another pair of parallel arms 365 is similarly provided with the integral studs 366, one of which is rotatably mounted in the bracket 360 and the other of which is rotatably mounted in the bracket 364. The two pairs of parallel arms are parallel to each other and are pivotally connected by the parallel links 367 so that they can be moved in unison. A shaft 368 is rotatably mounted in the free ends of the parallel arms 362, and a shaft 369 is rotatably mounted in the free ends of the parallel arms 365. Secured to these shafts 368 and 369 are the lifting brackets 370, which are provided with a bracing member 370a on each side and which rotatably mount on each side a shaft 371 having secured thereto a plurality of lifting fingers 372. These lifting fingers are notched at their lower ends as indicated at 373 for engagement with the edges of the tail.

When the tail has been so engaged, as shown in Fig. 32, the rod 353 is moved in a downward direction so that the arms 362 and 365 lift the tail with a parallel motion and transfer it to the position shown in dot and dash lines, whereupon the lifting fingers 372 are disengaged from the tail and permit it to drop. To effect this object, an arm 374 is secured to each shaft 371 and is pivotally attached at its free end to a link 375, the other end of each such link in turn being pivotally attached to the crank 376. This crank 376 is secured to the shaft 377 rotatably mounted in the lifting brackets 370. This shaft is provided with the torsion spring 378, one end of which is fastened to the collar 379 secured to this shaft and the other end of which is fastened to one of the lifting brackets 370. This torsion spring tends to turn the shaft 377 in a clockwise direction and, through the arrangement just described, keeps the lifting fingers 372 in firm contact with the edges of the tail T. An extension 380 of the right-hand arm 374 (as viewed in Fig. 32) carries an adjustable screw 381 provided with the locknut 382. When the mechanism nears the position shown in dot and dash lines, the screw 381 comes in contact with a pin 383 mounted in the corresponding arm 365 and thereby rotates the right-hand shaft 371 in a counterclockwise direction. Since the two shafts 371 are linked together, further motion of the lifting mechanism causes the fingers 372 to open up and release the tail T.

When the tail-lifting mechanism has released the tail, it is returned to its initial position, as shown in Fig. 32, by an upward movement of the rod 353. If the spring 378 were permitted to squeeze the opposite sets of the fingers 372 together during such movement, these fingers would rub over the next tail and might be damaged thereby. To avoid such damage, there is provided a latch mechanism including the toe 384, which is secured to the shaft 369 and has the pin 385 affixed therein, and the latch 386 secured to the shaft 377 (Figs. 33 and 35). The pawl 387 is rotatably mounted on the shaft 369 between the toe 384 and the corresponding lifting bracket 370. In the position shown in Fig. 35, the lifting mechanism is nearing the end of its return movement, and the shaft 369 is rotating slowly in a clockwise direction. As this shaft continues to so rotate, the pin 385 lifts the pawl 387 clear of the latch 386 and permits the spring 378 to rotate the shaft 377 in a clockwise direction. As the shaft 377 so rotates, the fingers 372 snap over the next tail. Thus, the fingers 372 are held out of contact with the next tail until the latch 386 is released, at which point the tail is engaged by the fingers. To provide only a limited rotation to the shaft 377 in the event that there is no tail to be lifted, an adjustable stop 388 is secured to the lifting bracket 370 for contact with the lower end of the latch 386.

The tail-lifting mechanism is housed between the end plate 340 secured to the frame 349 of the cooling unit and the parallel end plate 389 secured to the frame 191 of the finishing unit. These two end plates are made rigid by means of the tie rod 390 and the tie member 391. Mounted between these end plates is the grid 392, one end of which is releasably secured to the frame 191 of the finishing unit and the other end of which is releasably secured to the tie member 391 to form a guard over the tail-lifting mechanism.

The tail T, as it rests against the stop 339, is supported by the rollers 189. After the tail has been lifted off these rollers, the two plate-clamping mechanisms are lowered to put the rollers 188 and 189 in line with the rollers 393 (Fig. 2B) of the cooling unit 3, and the cast plate C, now finished, starts to roll over these rollers. Before the finished plate reaches the rollers 393, however, its edges first come into contact with the holdback rollers 394, which retard the speed at which the finished plate progresses down the inclined runway by means of the self-actuated retarding mechanisms 395 associated therewith (Figs. 1 and 2A). These mechanisms serve to prevent the finished plate from crashing against the plate stop 396 (Fig. 2B), hereinafter referred to, with damaging force and are similar in construction and operation to the retarding mechanisms 157.

In the operation of the finishing unit, the core 28 is first tilted to the inclined position as shown in Figs. 2 and 5 whereupon the slide brackets 81, the rollers 82 of which are moved upwardly into line with the rollers 188 upon contact of the projections 86 of the slide brackets with the stops 83 as previously indicated, dislodge the cast plate from the core. After the cast plate has slid into the finishing unit, the core 28 is returned to its vertical position for the next casting. During this return movement of the core, the cam 397 attached to one of the arms 51 (Figs. 2, 3, and 9) momentarily trips the arm 398 of the limit switch 399 mounted on the base 6 of the casting unit whereby an electric circuit is closed through energization of the operating solenoid 401 of the switch 400 (Fig. 36), the motor 8 is started, and the knife bar 195 is thereby rotated.

As the knife bar begins to rotate, the cam 243 causes the plate stop bracket 242 (Fig. 2A) to rise, and the cast plate is brought to rest by contact with the raised plate stops 158 in position for clamping the cast plate in the arch 192. Thereupon, the cams 324 and 325 operate their respective rock shafts 271 and 302 and thereby cause the corresponding plate-clamping mechanisms to raise the cast plate and position it against the arch liner 194 ready for finishing. The saw 218, which is driven from the simultaneously rotated shaft 224, the knife 235, and the beveling tools 234 and 251 respectively sever the tail T from the cast plate, shave the convex inner surface of the cast plate to a uniform radius, and trim the ends of the cast plate. As the tail is being severed from the cast plate, the arm 341 operates the rod 353 and causes the tail-lifting mechanism to be returned to its position for engaging the tail, which has meanwhile slid into position for removal and is then lifted off the inclined runway out of the path of the finished plate and dropped over the side of the machine for return to the metal-melting pot. During the lifting and removal of the tail, the plate-clamping mechanisms are lowered for withdrawal of the finished plate from the arch 192, and the plate-stop bracket 242 is then lowered. The finished plate thereupon rolls into the cooling unit, and the finishing unit is ready to receive another cast plate. During all these several operations, the knife bar 195 makes only one revolution.

Before the limit switch 399 is opened, the cam 402 adjustably secured to the hub 208a of the worm gear 208 (Fig. 2A) moves the lever 403 pivotally mounted on the bracket 202 and thereby trips the arm 404 of the limit switch 405 also mounted on the bracket 202 whereby the electric circuit closed by the operation of the limit switch 399 is maintained (Figs. 24 and 36) and the limit switch 405 controls the circuit. In the position of the apparatus as shown in Figs. 24 and 36, the cam 397 is about to trip the arm 398 of the limit switch 399, and the cam 402 keeps the limit switch 405 open. When the limit switch 399 closes the circuit, the knife bar 195 begins to rotate, and the limit switch 405 is thereby closed. At the completion of one revolution of the knife bar, the cam 402 through the lever 403 opens the limit switch 405 whereby the electric circuit is broken through deenergization of the solenoid 401 and the motor 8 is stopped. A magnetic brake 406 of known construction serves to stop the motor 8 as soon as the circuit is broken.

To insure that uniform shaving of the inner concave surface of the cast plate C is obtained, the upper and lower knife-bar bearings 196 and 197, which are suitably bolted to the frame 191 of the finishing unit, are made adjustable. To accomplish this purpose, a key 407 is secured to the frame 191 of the finishing unit, this key having a projection 408 against which bear the adjusting screws 409 threadedly mounted in each bearing (Fig. 37). Upon loosening of each bearing from the frame, the bearing may be moved laterally by the adjusting screws 409. The shims 410 are provided beneath each bearing so that the height of the knife bar 195 with respect to the arch 192 may be adjusted.

The finished plate P, upon entering the cooling unit, moves over the rollers 393 as already indicated (Figs. 2B and 38). Each of these rollers is rotatably mounted on a stud 411 fixed in the bar 412. The lock nuts 413 are provided so that the positions of the rollers 393 with reference to the center of the cooling unit may be suitably adjusted. The bar 412 is secured to the projections 414 of the frame 349 of the cooling unit.

As the finished plate P rolls into the cooling unit, one of its edges comes in contact with the roller 415 rotatably mounted on the free end of the arm 416, the other end of which is secured to the shaft 417 rotatably journaled in the frame 349 of the cooling unit. Also secured to the shaft 417 is the arm 418, the free end of which is pivotally connected to one end of the link 419. The other end of this link comprises a yoke pivotally attached to the trunnion 420, which is guided by the hub 421 on the volume-control valve 422. This volume-control valve, the construction and operation of which are well known, is provided with the inlet pipe 423 connected to a source of water under pressure. Upon each movement of the link 419 to the right (as viewed in Fig. 2B), the volume-control valve 422 is actuated thereby and permits a predetermined amount of water to flow through the outlet pipe 424. Also secured to the shaft 417 is the arm 425 pivotally attached to the link 426 in turn pivotally fastened to one end of the lever 427, which is pivoted on the stud 428 mounted in the frame 349 of the cooling unit. The other end of this lever 427 carries the weight 429, the position of which along the lever 427 can be adjusted in accordance with the weight of the finished plate entering the cooling unit.

The volume-control valve 422 is connected through its outlet pipe 424 to a special piston valve 430, in which the piston 431 is mounted. This piston abuts a spring 433 contained in the hollow tube 434 mounted in the bracket 435 attached to the base 349 of the cooling unit, the end 436 of the tube 434 being closed. The piston 431 is also pivotally connected to the lower end of the plate stop 396, which in turn is pivoted on the stud 437 fixed in the bracket 435. The bracket 435 and the bracket 438 (Fig. 2A) support the cooling-water chamber 439, which is formed in the shape of a half cylinder. The piston valve 430 is connected to this water chamber 439 through its outlet pipe 440, the manifold 441, and the pipes 442. The water chamber is provided with the openings 443, which are partially covered by the deflectors 444 that direct the cooling water against the concave inner surface of the finished plate P.

When the finished plate comes in contact with the roller 415, the arm 416 is depressed, and the link 419 is thereby moved to the right (as viewed in Fig. 2B). This movement actuates the volume-control valve 422 and permits water under pressure to flow through the pipe 424 into the piston valve 430 and through the inlet port 445 thereof (Figs. 38 and 39) against the piston 431. The pressure of this water pushes the piston 431 to the right against the spring 433. This movement of the piston elevates the plate stop 396 so that the finished plate comes into contact therewith and is brought to rest within the cooling unit. The water then flows out of the piston valve 430 through the outlet port 446 thereof, which is open when the piston 431 is at the right-hand end of its stroke, and through the outlet pipe 440, the manifold 441, and the pipes 442 to the water chamber 439. The water is caused to impinge against the inner surface of the finished plate, and the flow thereof is continued until the pre-determined amount of cooling water has been directed against the finished plate. A suitable drain pipe 447 provided with the screen 448 removes the water from the cooling unit.

When the predetermined amount of cooling water has passed through the volume-control valve 422, it automatically closes, and the pressure against the piston 431 is released. The spring 433 thereupon pushes the piston 431 to the left (as viewed in Fig. 2B), and the plate stop 396 is thereby lowered. The finished, cooled plate then rolls out of the cooling unit onto a conveyor or table (not shown), from which it is taken to the press room.

During each cycle the same predetermined amount of water passes through the volume-control valve 422, which can be adjusted to vary this amount as desired; and, hence, each cycle continues for a predetermined time interval. The operation of the plate stop 396 is thus timed to coordinate with the operation of the finishng unit by the supply of the requisite amount of water to cool each finished plate to the proper handling temperature.

The customary piping system for supplying the necessary cooling water to the several parts of the entire machine have been omitted in the interest of clarity. It will be appreciated, of course, that such piping system, together with any other usual elements which have been omitted from the drawings, will be included in the finished machine.

The plate cooling device disclosed but not claimed in this application is claimed in applicants' application Serial No. 714,486, filed December 6, 1946, which has matured into Patent No. 2,446,858.

We claim:

1. In a stereotype plate making machine having an inclined runway down which a plate can slide by gravity, a stop to position the plate at an intermediate portion of the runway and a cutter for severing a tail from the plate, the improvement which comprises means for lifting and laterally moving the severed plate tail off the runway and out of the path of the plate comprising two parallel arms, two pivots having laterally spaced axes both disposed on one side of the runway and extending lengthwise of the runway for respectively supporting said parallel arms to swing laterally over and away from the runway, a plate-tail lifting bracket, plate-tail lifting means depending from said bracket to engage beneath the lower edges of the plate tail, pivots respectively connecting laterally-spaced points of said bracket to said respective parallel arms, means for swinging said parallel arms about the pivots on which they respectively are supported, and means operated by movement of said arms to release said plate-tail engaging means when said arms are moved laterally away from the runway.

2. In a stereotype plate making machine having an inclined runway down which a plate can slide by gravity, a stop to position the plate at an intermediate portion of the runway and a cutter for severing a tail from the plate, the improvement which comprises means for lifting and laterally moving the severed plate tail off the runway and out of the path of the plate comprising two parallel arms, two pivots having laterally spaced axes both disposed on one side of the runway and extending lengthwise of the runway for respectively supporting said parallel arms to swing laterally over and away from the runway, a plate-tail lifting bracket, plate-tail lifting means depending from said bracket to engage beneath the lower edge of the plate tail, pivots respectively connecting laterally-spaced points of said bracket to said respective parallel arms, means for swinging said parallel arms about the pivots on which they respectively are supported, means operated by movement of said arms to move said plate-tail lifting means to a position to release a plate tail when said arms are moved laterally away from the runway, and means preventing return of the plate-tail lifting means to a plate-tail engaging position until the plate-tail lifting bracket has been returned to its position over the runway.

3. In a stereotype plate making machine having an inclined runway down which a plate can slide by gravity, a stop to position the plate at an intermediate portion of the runway and a cutter for severing a tail from the plate, the improvement which comprises means for lifting and laterally moving the severed plate tail off the runway and out of the path of the plate, comprising a first pair of parallel arms pivotally supported at one side of the runway on an axis extending longitudinally of the runway and having free ends movable from positions over the runway to positions laterally displaced from the runway, a second pair of parallel arms pivotally supported adjacent the runway on an axis parallel to and displaced laterally of the runway from the pivoted axis of said first pair of parallel arms, said second pair of parallel arms having free ends movable parallel to the free ends of said first pair of parallel arms, a plate-tail lifting bracket, plate-tail lifting means depending from said bracket to engage beneath the lower edges of the plate tail, means pivotally connecting the free ends of said first and second pairs of parallel arms respectively to laterally-spaced points on said plate-tail lifting bracket, means for swinging said pairs of parallel arms about the pivots on which they respectively are supported to move said bracket substantially parallel to itself from a position over said runway to a position laterally displaced from the runway, and means operated by movement of said arms to release said plate-tail engaging means when said arms are moved laterally away from the runway.

4. In a stereotype plate making machine having an inclined runway down which a plate can slide by gravity, a stop to position the plate at an intermediate portion of the runway and a cutter for severing a tail from the plate, the improvement which comprises means for lifting and laterally moving the severed plate tail off the runway and out of the path of the plate, comprising a first pair of parallel arms pivotally supported at one side of the runway on an axis extending longitudinally of the runway and having free ends movable from positions over the runway to positions laterally displaced from the runway, a second pair of parallel arms pivotally supported adjacent the runway on an axis parallel to and displaced laterally of the runway from the pivoted axis of said first pair of parallel arms, said second pair of parallel arms having free ends movable parallel to the free ends of said first pair of parallel arms, a plate-tail lifting bracket, plate-tail lifting means depending from said bracket to engage beneath the lower edges of the plate tail, means for pivotally connecting the free ends of said first and second pairs of parallel ends respectively to laterally-spaced points on said plate-tail lifting bracket, means for swinging said pairs of parallel arms about the pivots on which they respectively are supported to move said bracket substantially parallel to itself from a position over said runway to a position laterally displaced from the runway, means operated by movement of said arms to move said plate-tail lifting means to a position to release a plate tail when said arms are moved laterally away from the runway, and means preventing return of the plate-tail lifting means to a plate-tail engaging position until the plate-tail lifting bracket has been returned to its positon over the runway, and the plate-tail lifting means are in a position to engage the lower edges of a plate tail.

5. In a stereotype plate making machine having an inclined runway down which a plate can slide by gravity, a stop to position the plate at an intermediate portion of the runway and a cutter for severing a tail from the plate, the improvement which comprises means for lifting and laterally moving the severed plate tail off the runway and out of the path of the plate, comprising two pivots having laterally-spaced axes, each of said axes being disposed at one side of the runway in a vertical plane which does not intersect the runway and extending lengthwise of the runway, a pair of parallel arms mounted for pivotal movement on said pivots and extending therefrom a distance sufficient to swing laterally over the runway to a position to overlie a plate tail to be removed from the runway, a plate-tail lifting bracket, means carried by said bracket for engaging a plate tail, the ends of the respective arms remote from their said pivotal mounting being pivotally connected at laterally spaced points to an upper portion of said bracket, and means for swinging said arms to move said bracket laterally over and away from the runway.

6. In a stereotype plate making machine having an inclined runway down which a plate can slide by gravity, a stop to position the plate at an intermediate portion of the runway and a cutter for severing a tail from the plate, the improvement which comprises means for lifting and laterally moving the severed plate tail off the runway and out of the path of the plate, comprising a first pair of parallel arms pivotally supported at one side of the runway on an axis extending lengthwise of the runway at one side thereof, a second pair of parallel arms pivotally supported on an axis adjacent the runway and parallel to and displaced laterally of the runway from the axis on which said first pair of said parallel arms are pivoted, the axis on which both of said pairs of parallel arms are pivotally supported being in vertical planes which do not intersect the runway, both pairs of parallel arms extending from the axis on which they are mounted a distance sufficient to swing lateraly over the runway, a plate-tail lifting bracket, means carried by said bracket for engaging a plate tail, the ends of said first pair of arms being connected to said bracket at positions displaced lengthwise of the runway, the ends of the second pair of arms being connected to said bracket at positions displaced lengthwise of the runway and laterally of the positions to which said ends of the first pair of arms are connected to said bracket, said ends of the second pair of arms being movable parallel to said ends of the first pair of arms, and means for swinging said arms to move said plate-tail lifting bracket laterally parallel to itself from a position over the runway to a position laterally displaced from the runway.

7. The improvement in a stereotype plate making machine as defined in claim 5 in which the means carried by the plate-tail lifting bracket for engaging the plate tail includes lifting fingers depending from the plate-tail lifting bracket and having portions adapted to engage beneath the edges of a plate tail.

PAUL L. TOLLISON.
CHARLES L. RICARDS.

REFERENCES CITED

The following references are of record in the file of this patent:

UNITED STATES PATENTS

| Number | Name | Date |
|---|---|---|
| 1,134,798 | Wood | Apr. 6, 1915 |
| 1,238,973 | Wood | Sept. 4, 1917 |
| 1,269,239 | Wood | June 11, 1918 |
| 1,286,478 | Wood | Dec. 3, 1918 |
| 1,330,942 | Hopkins | Feb. 17, 1920 |
| 1,695,075 | Zimmerman | Dec. 11, 1928 |
| 1,783,345 | Roesen | Dec. 2, 1930 |
| 2,137,190 | Wood | Nov. 15, 1938 |
| 2,285,680 | Roesen | June 9, 1942 |